(12) United States Patent
Moon et al.

(10) Patent No.: US 7,106,513 B2
(45) Date of Patent: Sep. 12, 2006

(54) DIFFRACTION GRATING-BASED ENCODED PARTICLE

(75) Inventors: John A. Moon, Wallingford, CT (US); Martin A. Putnam, Cheshire, CT (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 10/661,234

(22) Filed: Sep. 12, 2003

(65) Prior Publication Data

US 2004/0233485 A1  Nov. 25, 2004

Related U.S. Application Data

(63) Continuation-in-part of application No. 10/645,689, filed on Aug. 20, 2003.

(60) Provisional application No. 60/410,541, filed on Sep. 12, 2002.

(51) Int. Cl.
*G02B 5/18* (2006.01)

(52) U.S. Cl. ............... 359/569; 435/288.7; 436/518

(58) Field of Classification Search ............ 359/2, 359/566, 569, 558, 571, 5, 72; 356/72, 73.1; 385/12, 128, 37; 250/559.04, 559.11, 559.4, 250/227.14, 227.29, 566, 568; 235/473; 435/4, 6, 228.7; 436/518, 524, 525, 526, 436/527, 528, 531
See application file for complete search history.

(56) References Cited

U.S. PATENT DOCUMENTS

| 3,891,302 A | 6/1975 | Dabby et al. ............ 385/37 |
|---|---|---|
| 3,916,182 A | 10/1975 | Dabby et al ............ 398/212 |
| 3,968,476 A | 7/1976 | McMahon ............ 382/127 |
| 4,011,435 A | 3/1977 | Phelps ............ 235/454 |
| 4,023,010 A | 5/1977 | Horst et al ............ 235/454 |
| 4,053,228 A | 10/1977 | Schiller ............ 356/71 |
| 4,131,337 A | 12/1978 | Moraw et al ............ 352/2 |
| 4,386,274 A | 5/1983 | Altshuler ............ 250/251 |
| 4,445,229 A | 4/1984 | Tasto et al ............ 381/110 |
| 4,537,504 A | 8/1985 | Baltes et al. ............ 356/71 |
| 4,560,881 A | 12/1985 | Briggs ............ 250/458.1 |
| 4,562,157 A | 12/1985 | Lowe et al ............ 435/287.2 |
| 4,647,544 A | 3/1987 | Nicoli et al ............ 436/518 |
| 4,678,752 A | 7/1987 | Thorne et al ............ 435/287.3 |
| 4,685,480 A | 8/1987 | Eck ............ 134/182 |
| 4,725,110 A | 2/1988 | Glenn et al. ............ 359/3 |
| 4,740,688 A | 4/1988 | Edwards ............ 250/226 |
| 4,748,110 A | 5/1988 | Paul ............ 435/5 |
| 4,767,719 A | 8/1988 | Finlan ............ 436/501 |
| 4,807,950 A | 2/1989 | Glenn et al. ............ 385/123 |
| 4,816,659 A | 3/1989 | Bianco et al ............ 235/462.21 |

(Continued)

FOREIGN PATENT DOCUMENTS

EP    1219979    7/2002

(Continued)

OTHER PUBLICATIONS

U.S. Appl. No. 10/645,689.*

(Continued)

*Primary Examiner*—Arnel C. Lavarias

(57) ABSTRACT

An encoded particle 8 includes a particle substrate 10; at least a portion of the substrate having at least one diffraction grating disposed therein, the grating having a resultant refractive index variation at a grating location, the grating being embedded within a substantially single material of the substrate; and the grating providing an output optical signal indicative of a code when illuminated by an incident light signal propagating in free space, the output optical signal being a result of passive, non-resonant scattering from the grating when illuminated by the incident light signal.

70 Claims, 23 Drawing Sheets

U.S. PATENT DOCUMENTS

| | | | |
|---|---|---|---|
| 4,841,140 A | 6/1989 | Sullivan et al | 250/226 |
| 4,877,747 A | 10/1989 | Stewart | 436/525 |
| 4,880,752 A | 11/1989 | Keck et al | 435/7.72 |
| 4,882,288 A | 11/1989 | North et al | 436/525 |
| 4,921,805 A | 5/1990 | Gebeyehu et al | 435/270 |
| 4,931,384 A | 6/1990 | Layton et al | 435/7.31 |
| 4,958,376 A | 9/1990 | Leib | 382/210 |
| 4,992,385 A | 2/1991 | Godfrey | 436/525 |
| 5,003,600 A | 3/1991 | Deason | 380/54 |
| RE33,581 E | 4/1991 | Nicoli et al | 435/7.2 |
| 5,033,826 A | 7/1991 | Kolner | 359/245 |
| 5,067,155 A | 11/1991 | Bianco et al | 713/185 |
| 5,081,012 A | 1/1992 | Flanagan et al | 435/7.9 |
| 5,089,387 A | 2/1992 | Tsay et al | 435/6 |
| 5,095,194 A | 3/1992 | Barbanell | 235/379 |
| 5,100,238 A | 3/1992 | Nailor et al | 356/246 |
| 5,115,121 A | 5/1992 | Bianco et al | 235/462.25 |
| 5,118,608 A | 6/1992 | Layton et al | 435/7.1 |
| 5,138,468 A | 8/1992 | Barbanell | 359/2 |
| 5,141,848 A | 8/1992 | Donovan et al | 435/5 |
| 5,144,461 A | 9/1992 | Horan | 359/30 |
| 5,166,813 A | 11/1992 | Metz | 359/15 |
| 5,196,350 A | 3/1993 | Backman et al | 436/501 |
| 5,200,794 A | 4/1993 | Nishiguma et al | 356/71 |
| 5,291,006 A | 3/1994 | Nishiguma et al | 235/454 |
| 5,291,027 A | 3/1994 | Kita et al | 250/566 |
| 5,300,764 A | 4/1994 | Hoshino et al | 235/487 |
| 5,310,686 A | 5/1994 | Sawyers et al | 436/518 |
| 5,349,442 A | 9/1994 | Deason et al | 356/521 |
| 5,352,582 A | 10/1994 | Lichtenwalter et al | 435/6 |
| 5,364,797 A | 11/1994 | Olson et al | 436/501 |
| 5,367,588 A | 11/1994 | Hill et al. | 385/37 |
| 5,374,816 A | 12/1994 | Bianco | 235/454 |
| 5,374,818 A | 12/1994 | Bianco et al | 235/492 |
| 5,388,173 A | 2/1995 | Glenn | 385/37 |
| 5,394,234 A | 2/1995 | Bianco et al | 356/71 |
| 5,442,433 A | 8/1995 | Hoshino et al | 356/71 |
| 5,448,659 A | 9/1995 | Tsutsui et al | 385/14 |
| 5,451,528 A | 9/1995 | Raymoure et al | 436/533 |
| 5,461,475 A | 10/1995 | Lerner et al | 356/300 |
| 5,465,176 A | 11/1995 | Bianco et al | 359/567 |
| 5,468,649 A | 11/1995 | Shah et al | 436/518 |
| 5,506,674 A | 4/1996 | Inoue et al | 356/73.1 |
| 5,514,785 A | 5/1996 | Van Ness et al | 536/22.1 |
| 5,528,045 A | 6/1996 | Hoffman et al | 250/458.1 |
| 5,547,849 A | 8/1996 | Baer et al | 435/7.24 |
| 5,559,613 A | 9/1996 | Deveaud-Pledran et al. | 395/4 |
| 5,585,639 A | 12/1996 | Dorsal et al | 250/458.1 |
| 5,607,188 A | 3/1997 | Bahns et al | 283/113 |
| 5,621,515 A | 4/1997 | Hoshino | 356/71 |
| 5,627,040 A | 5/1997 | Bierre et al | 435/7.24 |
| 5,627,663 A | 5/1997 | Horan et al | 359/2 |
| 5,633,724 A | 5/1997 | King et al | 356/445 |
| 5,633,975 A * | 5/1997 | Gary et al. | 385/147 |
| 5,663,790 A | 9/1997 | Ekstrom et al | 356/128 |
| 5,667,976 A | 9/1997 | Van Ness et al | 435/6 |
| 5,671,308 A | 9/1997 | Inoue et al | 385/37 |
| 5,712,912 A | 1/1998 | Tomko et al | 713/186 |
| 5,721,435 A | 2/1998 | Troll | 250/559.29 |
| 5,729,365 A | 3/1998 | Sweatt | 359/2 |
| 5,736,330 A | 4/1998 | Fulton | 435/6 |
| 5,742,432 A | 4/1998 | Bianco | 359/566 |
| 5,745,615 A | 4/1998 | Atkins et al. | 385/37 |
| 5,759,778 A | 6/1998 | Li et al | 435/6 |
| 5,760,961 A | 6/1998 | Tompkin et al | 359/576 |
| 5,766,956 A | 6/1998 | Groger et al | 436/164 |
| 5,793,502 A | 8/1998 | Bianco et al | 359/2 |
| 5,798,273 A | 8/1998 | Shuler et al | 436/514 |
| 5,799,231 A | 8/1998 | Gates et al | 399/115 |
| 5,801,857 A | 9/1998 | Heckenkamp et al | 359/2 |
| 5,804,384 A | 9/1998 | Muller et al | 435/6 |
| 5,822,472 A | 10/1998 | Danielzik et al | 385/12 |
| 5,824,478 A | 10/1998 | Muller | 435/6 |
| 5,824,557 A | 10/1998 | Burke et al | 436/94 |
| 5,831,698 A | 11/1998 | Depp et al | 349/64 |
| 5,837,475 A | 11/1998 | Dorsal et al | 435/7.1 |
| 5,841,555 A | 11/1998 | Bianco et al | 359/2 |
| 5,846,737 A | 12/1998 | Kang | 435/7.1 |
| 5,874,187 A | 2/1999 | Colvin et al | 430/2 |
| 5,895,750 A | 4/1999 | Mushahwar et al | 435/7.5 |
| 5,922,550 A | 7/1999 | Everhart et al | 435/7.21 |
| 5,925,562 A | 7/1999 | Nova et al | 435/287.1 |
| 5,925,878 A | 7/1999 | Challener | 250/225 |
| 5,945,679 A | 8/1999 | Dorsal et al | 250/458.1 |
| 5,981,166 A | 11/1999 | Mandecki | 435/4 |
| 5,986,838 A | 11/1999 | Thomas, III | 360/60 |
| 5,989,923 A | 11/1999 | Lowe et al | 436/518 |
| 5,998,796 A | 12/1999 | Liu et al | 250/458.1 |
| 6,001,510 A | 12/1999 | Meng et al | 430/1 |
| 6,005,691 A * | 12/1999 | Grot et al. | 359/2 |
| 6,017,754 A | 1/2000 | Chesnut et al | 435/320.1 |
| 6,025,129 A | 2/2000 | Nova et al | 435/6 |
| 6,025,283 A | 2/2000 | Roberts | 442/15 |
| 6,036,807 A | 3/2000 | Brongers | 156/233 |
| 6,043,880 A | 3/2000 | Andrews et al | 356/311 |
| 6,046,925 A | 4/2000 | Tsien et al | 365/111 |
| 6,049,727 A | 4/2000 | Crothall | 600/310 |
| 6,057,107 A | 5/2000 | Fulton | 435/6 |
| 6,060,256 A | 5/2000 | Everhart et al | 435/7.21 |
| 6,067,167 A | 5/2000 | Atkinson et al | 356/437 |
| 6,067,392 A | 5/2000 | Wakami et al | 385/37 |
| 6,078,048 A | 6/2000 | Stevens et al | 250/339.02 |
| 6,087,186 A | 7/2000 | Cargill et al | 436/518 |
| 6,096,496 A | 8/2000 | Frankel et al | 435/4 |
| 6,097,485 A | 8/2000 | Lievan | 356/338 |
| 6,103,535 A | 8/2000 | Pilevar et al | 436/518 |
| 6,118,127 A | 9/2000 | Liu et al | 250/458.1 |
| 6,156,501 A | 12/2000 | McGall et al. | 435/6 |
| 6,160,240 A | 12/2000 | Momma et al | 219/121.85 |
| 6,160,656 A | 12/2000 | Mossberg et al | 359/328 |
| 6,164,548 A | 12/2000 | Curiel | 235/487 |
| 6,165,592 A | 12/2000 | Berger et al | 428/195.1 |
| 6,165,648 A | 12/2000 | Colvin et al | 430/1 |
| 6,194,563 B1 | 2/2001 | Cruickshank | 536/25.3 |
| 6,214,560 B1 * | 4/2001 | Yguerabide et al. | 435/7.1 |
| 6,218,194 B1 | 4/2001 | Lyndin et al | 436/518 |
| 6,221,579 B1 | 4/2001 | Everhart et al | 435/5 |
| 6,229,635 B1 | 5/2001 | Wulf | 359/196 |
| 6,259,450 B1 | 7/2001 | Chiabrera et al | 345/419 |
| 6,268,128 B1 | 7/2001 | Collins et al | 435/6 |
| 6,284,459 B1 | 9/2001 | Nova et al | 435/6 |
| 6,292,282 B1 | 9/2001 | Mossberg et al | 398/99 |
| 6,292,319 B1 | 9/2001 | Thomas, III | 360/60 |
| 6,301,047 B1 | 10/2001 | Hoshino et al | 359/566 |
| 6,304,263 B1 | 10/2001 | Chiabrera et al | 345/419 |
| 6,306,587 B1 | 10/2001 | Royer et al | 435/6 |
| 6,309,601 B1 | 10/2001 | Juncosa et al | 422/68.1 |
| 6,312,961 B1 | 11/2001 | Voirin et al | 436/518 |
| 6,313,771 B1 | 11/2001 | Munroe et al | 341/137 |
| 6,314,220 B1 | 11/2001 | Mossberg et al | 385/37 |
| 6,319,668 B1 | 11/2001 | Nova et al | 435/6 |
| 6,322,932 B1 | 11/2001 | Colvin et al | 430/2 |
| RE37,473 E | 12/2001 | Challener | 250/225 |
| 6,329,963 B1 | 12/2001 | Chiabrera et al | 345/6 |
| 6,331,273 B1 | 12/2001 | Nova et al | 422/68.1 |
| 6,340,588 B1 | 1/2002 | Nova et al | 435/287.1 |
| 6,352,854 B1 | 3/2002 | Nova et al | 435/287.1 |
| 6,355,198 B1 | 3/2002 | Kim et al | 264/259 |
| 6,355,432 B1 | 3/2002 | Fodor et al. | 435/6 |
| 6,371,370 B1 | 4/2002 | Sadler | 235/454 |
| 6,372,428 B1 | 4/2002 | Nova et al | 435/6 |
| 6,399,295 B1 | 6/2002 | Kaylor et al | 435/5 |
| 6,403,320 B1 | 6/2002 | Read et al. | 435/6 |
| 6,406,841 B1 | 6/2002 | Lee et al | 435/5 |

| | | | |
|---|---|---|---|
| 6,406,848 B1 | 6/2002 | Bridgham et al | 435/6 |
| 6,416,714 B1 | 7/2002 | Nova et al | 422/68.1 |
| 6,416,952 B1 | 7/2002 | Pirrung et al. | 435/6 |
| 6,417,010 B1 | 7/2002 | Cargill et al | 436/518 |
| 6,428,707 B1 | 8/2002 | Berg et al | 210/661 |
| 6,428,957 B1 | 8/2002 | Delenstarr | 435/6 |
| 6,433,849 B1 | 8/2002 | Lowe | 342/123 |
| 6,436,651 B1 | 8/2002 | Everhart et al | 435/7.21 |
| 6,440,667 B1 | 8/2002 | Fodor et al. | 435/6 |
| RE37,891 E | 10/2002 | Collins et al | 435/6 |
| 6,489,606 B1 | 12/2002 | Kersey et al | 250/227.14 |
| 6,496,287 B1 | 12/2002 | Seiberle et al | 359/15 |
| 6,506,342 B1 | 1/2003 | Frankel | 422/63 |
| 6,515,753 B1 | 2/2003 | Maher et al | 356/614 |
| 6,522,406 B1 | 2/2003 | Rovira et al | 356/369 |
| 6,524,793 B1 | 2/2003 | Chandler et al | 435/6 |
| 6,533,183 B1 | 3/2003 | Aasmul | 235/494 |
| 6,544,739 B1 | 4/2003 | Fodor et al. | 435/6 |
| 6,560,017 B1 | 5/2003 | Bianco | 359/566 |
| 6,565,770 B1 | 5/2003 | Mayer et al | 252/301.36 |
| 6,576,424 B1 | 6/2003 | Fodor et al. | 435/6 |
| 6,592,036 B1 | 7/2003 | Sadler | 235/454 |
| 6,594,421 B1 | 7/2003 | Johnson et al | 385/37 |
| 6,609,728 B1 | 8/2003 | Voerman et al | 283/70 |
| 6,613,581 B1 | 9/2003 | Wada et al | 436/518 |
| 6,618,342 B1 | 9/2003 | Johnson et al | 369/100 |
| 6,622,916 B1 | 9/2003 | Bianco | 235/454 |
| 6,628,439 B1 | 9/2003 | Shiozawa et al | 359/2 |
| 6,632,655 B1 | 10/2003 | Mehta et al | 435/288.5 |
| 6,635,470 B1 | 10/2003 | Vann | 435/287.2 |
| 6,646,243 B1 | 11/2003 | Pirrung et al. | 250/200 |
| 6,678,429 B1 | 1/2004 | Mossberg et al | 385/10 |
| 6,689,316 B1 | 2/2004 | Blyth et al | 422/56 |
| 6,692,031 B1 | 2/2004 | McGrew | 283/93 |
| 6,692,912 B1 | 2/2004 | Boles et al | 435/6 |
| 2002/0022273 A1 | 2/2002 | Empedocles et al | |
| 2002/0039732 A1 | 4/2002 | Bruchez et al. | 435/6 |
| 2002/0090650 A1 | 7/2002 | Empedocles et al | |
| 2003/0032203 A1 | 2/2003 | Sabatini et al | |
| 2003/0129654 A1* | 7/2003 | Ravkin et al. | 435/7.1 |
| 2003/0138208 A1 | 7/2003 | Pawlak et al | |
| 2004/0263923 A1* | 12/2004 | Moon et al. | 359/2 |

FOREIGN PATENT DOCUMENTS

| | | |
|---|---|---|
| GB | 2372100 | 8/2002 |
| WO | 9715690 | 5/1997 |
| WO | 0158583 | 8/2001 |
| WO | 03061983 | 7/2003 |
| WO | WO 03/061983 | 7/2003 |

OTHER PUBLICATIONS

Raman Kashyap, Fiber Bragg Gratings, Academic Press, Chapter 9, pp. 430-434.
Peter A. Krug, Measurement of index modulation along an optical fiber Bragg grating, vol. 20, No. 17, Sep. 1, 2005.
Pierre-Yves Fonjallas, et al, Interferometric side diffraction technique for the characterisation of fibre gratings, 1999 OSA Conf., Sep. 23-25, 1999.
E. N. Leith et al., Holographic Data Storage in Three-Dimensional Applied Optics, vol. 5, No. 8, pp. 1303-1311, Aug. 1966.
A. Vander Lugt, Design Relationships for Holographic Memories Applied Optics, vol. 12, No. 7, pp. 1675-1685, Jul. 1973.
Herwig Kogelnik, Coupled Wave Theory for Thick Hologram Gratings Bell Sys. Tech. Journal, vol. 48, No. 9, pp. 2909-2947, Nov. 1969.
Jain, K. K. "Nanodiagnostics: Application of Nanotechnology in Molecular Diagnostics", *Expert Review of Molecular Diagnostics*, 3 (2), Future Drugs Ltd., (Mar., 2003), 153-161.
Yuen, P. K., et al., "Microbarcode Sorting Device", *Lab on a Chip*.vol. 03 (3). The Royal Society of Chemistry 2003, (Aug. 2003), 198-201.
Othonos, A., et al., "Superimposed Multiple Bragg Gratings", *electronics Letters, 30,* (Nov. 10, 1994), 1972-1974.

* cited by examiner

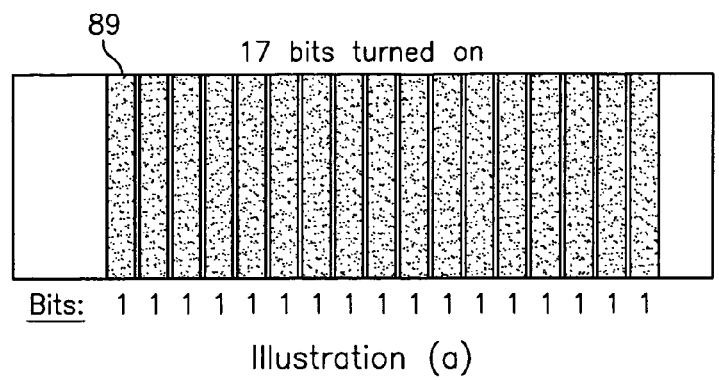
17 bits turned on
Bits: 1 1 1 1 1 1 1 1 1 1 1 1 1 1 1 1 1
Illustration (a)
FIG. 9
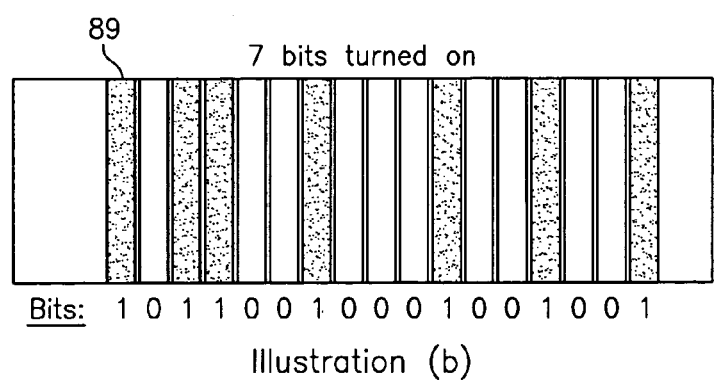
7 bits turned on
Bits: 1 0 1 1 0 0 1 0 0 0 1 0 0 1 0 0 1
Illustration (b)
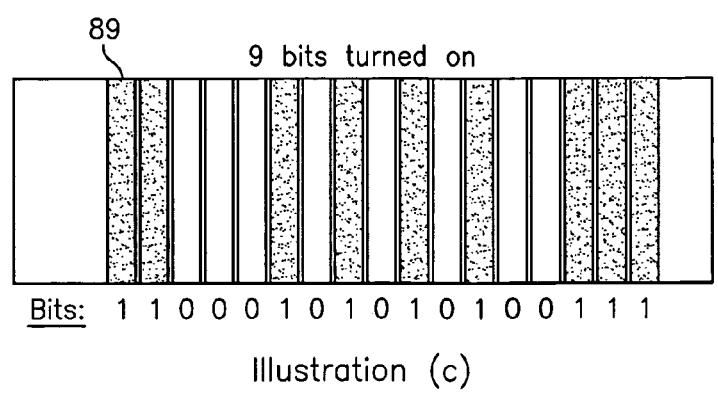
9 bits turned on
Bits: 1 1 0 0 0 1 0 1 0 1 0 1 0 0 1 1 1
Illustration (c)

Illustration (b)

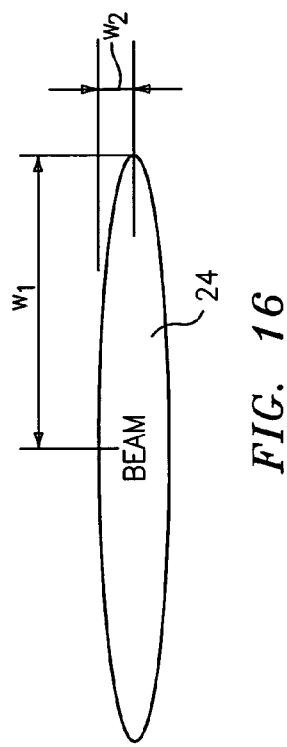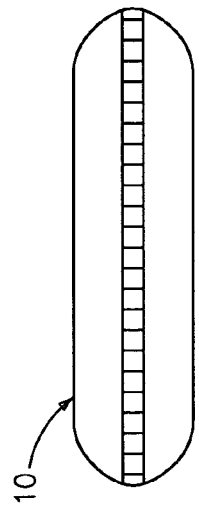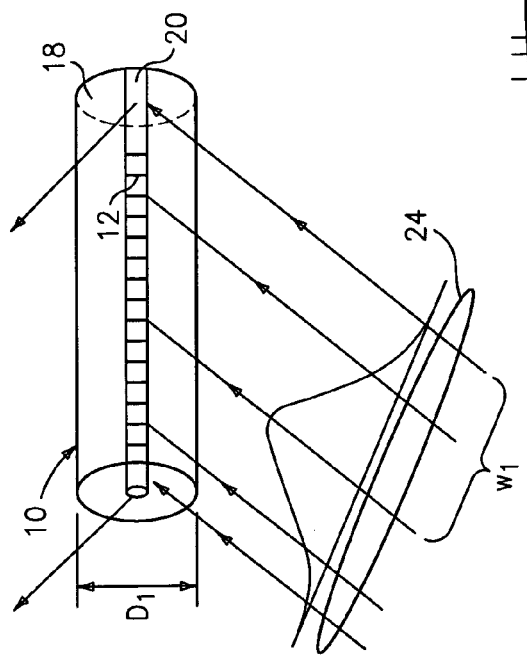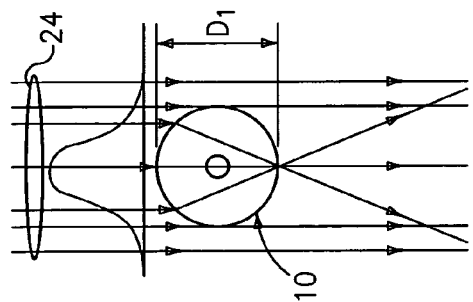
FIG. 16
FIG. 17
FIG. 13
FIG. 12

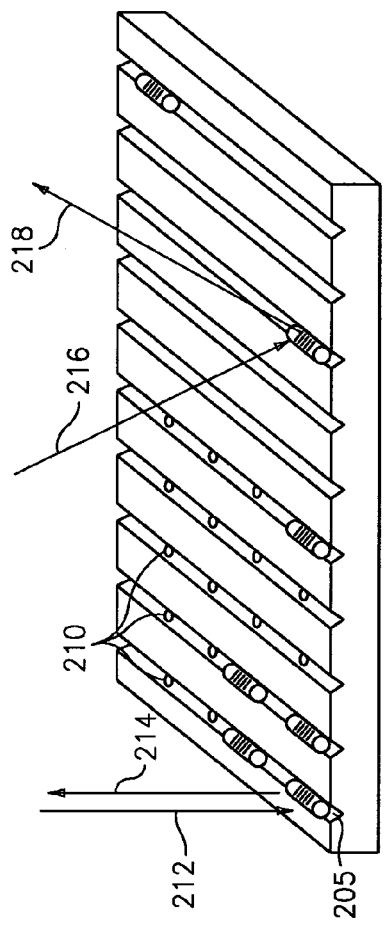
FIG. 28
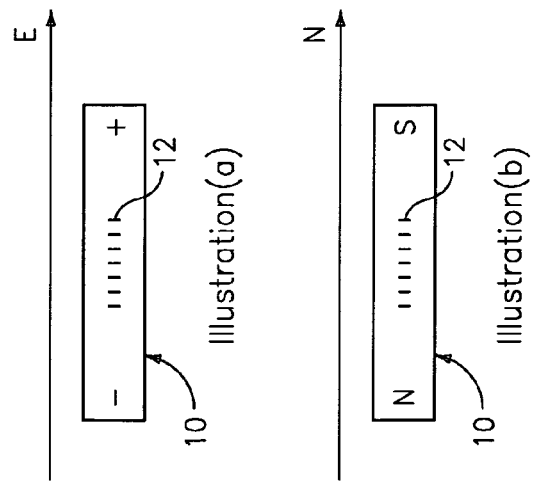
FIG. 57
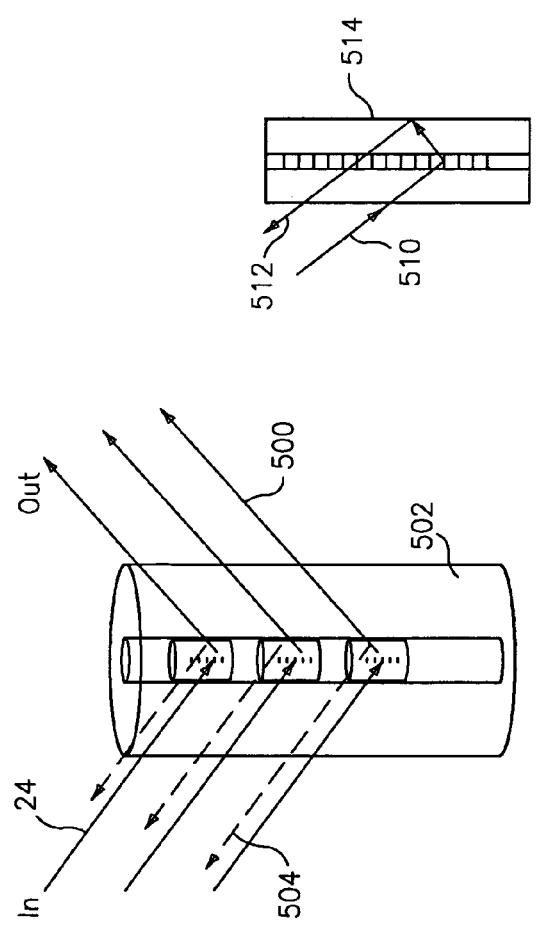
FIG. 30
FIG. 29

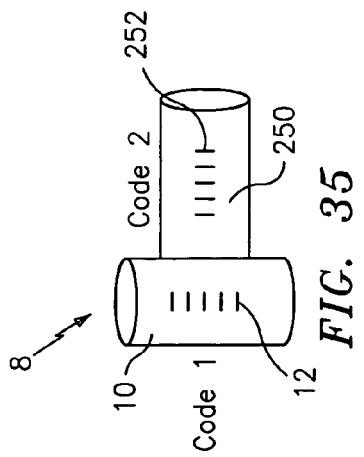
FIG. 35
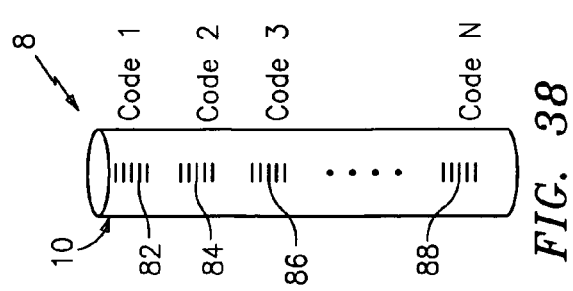
FIG. 38
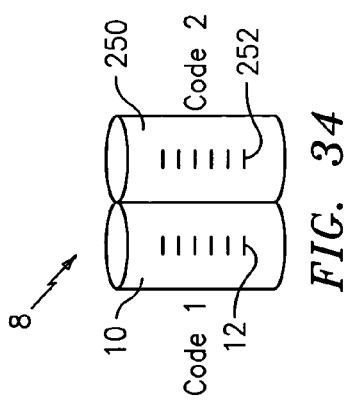
FIG. 34
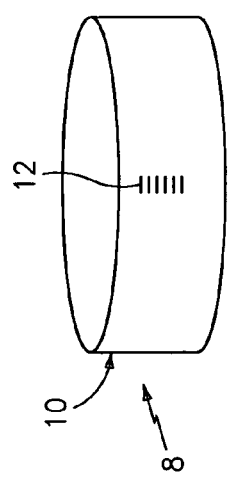
FIG. 37
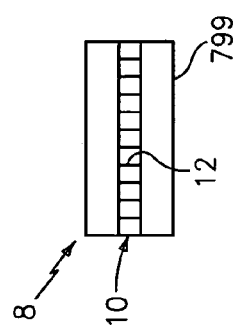
FIG. 58
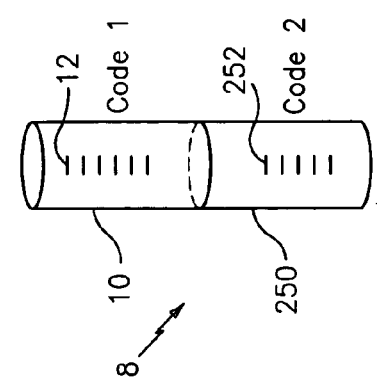
FIG. 33
FIG. 36

US 7,106,513 B2

DIFFRACTION GRATING-BASED ENCODED PARTICLE

CROSS REFERENCES TO RELATED APPLICATIONS

This application claims the benefit of U.S. Provisional Patent Applications, Ser. No. 60/410,541, filed Sept. 12, 2002, and is a continuation-in-part of U.S. patent applications, Ser. No. 10/645,689 filed Aug. 20, 2003, each of which are incorporated herein by reference in their entirety.

U.S. patent application Ser. No. 10/661,082 (publication no. US 2004-0179267 A1), filed concurrently herewith, entitled "Method and Apparatus for Labeling Using Diffraction Grating-Based Encoded Optical Identification Element", filed contemporaneously herewith, contains subject matter related to that disclosed herein, which is incorporated by reference in its entirety.

TECHNICAL FIELD

This invention relates to optical identification, and more particularly to optical elements used for identification or coding using diffraction gratings.

BACKGROUND ART

Many industries have a need for uniquely identifiable objects or for the ability to uniquely identify objects, for sorting, tracking, and/or identification/tagging. Existing technologies, such as bar codes, electronic microchips/transponders, radio-frequency identification (RFID), and fluorescence and other optical techniques, are often inadequate. For example, existing technologies may be too large for certain applications, may not provide enough different codes, or cannot withstand harsh temperature, chemical, nuclear and/or electromagnetic environments.

Therefore, it would be desirable to obtain a coding element or platform that provides the capability of providing many codes (e.g., greater than 1 million codes), that can be made very small, and/or that can withstand harsh environments.

SUMMARY OF THE INVENTION

Objects of the present invention include provision of an optical identification element or platform that allows for a large number of distinct codes, can be made very small, and/or can withstand harsh environments.

According to the present invention, an encoded particle includes a particle substrate; at least a portion of the substrate being made of a substantially single material and having at least one diffraction grating embedded therein, said grating having a resultant refractive index variation within single material at a grating locations the refractive index variation comprising a plurality of refractive index pitches superimposed at the grating location; and the grating providing an output optical signal indicative of a code when illuminated by an incident light signal propagating from outside the substrate, the output optical signal being a result of passive, non-resonant scattering from the grating when illuminated by the incident light signal.

The present invention provides an optical element capable of having many optically readable codes. The element has a substrate containing an optically readable composite diffraction grating having one or more collocated index spacing or pitches $\Lambda$. The invention allows for a high number of uniquely identifiable codes (e.g., millions, billions, or more). The codes may be digital binary codes and thus are digitally readable or may be other numerical bases if desired.

The element may be made of a glass material, such as silica or other glasses, or may be made of plastic, or any other material capable of having a diffraction grating disposed therein. The element may be cylindrical in shape or any other geometry, provided the design parameters are met.

Also, the elements may be very small "microbeads" (or microelements or microparticles or encoded particles) for small applications (about 1–1000 microns). The elements may also be referred to as encoded particles or encoded threads.

The code in the element is interrogated using free-space optics and can be made alignment insensitive.

The gratings (or codes) are embedded inside (including on or near the surface) of the substrate and may be permanent non-removable codes that can operate in harsh environments (chemical, temperature, nuclear, electromagnetic, etc.).

The code is not affected by spot imperfections, scratches, cracks or breaks in the substrate. In addition, the codes are spatially invariant. Thus, splitting or slicing an element axially produces more elements with the same code. Accordingly, when a bead is axially split-up, the code is not lost, but instead replicated in each piece.

The foregoing and other objects, features and advantages of the present invention will become more apparent in light of the following detailed description of exemplary embodiments thereof.

BRIEF DESCRIPTION OF THE DRAWINGS

FIG. 9 illustrations (a)–(c) show images of digital codes on a CCD camera, in accordance with the present invention.

FIGS. 12–15 are side and end views of an optical identification element and optics associated therewith, in accordance with the present invention.

FIG. 16 is an end view of a beam for an optical identification element, in accordance with the present invention.

FIG. 17 is a side view of an alternative embodiment of an optical identification element, in accordance with the present invention.

FIG. 28 is a perspective view of a grooved plate for use with an optical identification element, in accordance with the present invention.

FIG. 29 is a perspective view of a tube for use with an optical identification element, in accordance with the present invention.

FIG. 30 is a side view an optical identification element having a reflective coating thereon, in accordance with the present invention.

FIG. 33–38 are alternative embodiments for an optical identification element, in accordance with the present invention.

FIG. 57 illustrations (a)–(b) are side views of an optical identification element polarized along an electric or magnetic field, in accordance with the present invention.

FIG. 58 is a side view of an optical identification element having a coating, in accordance with the present invention.

BEST MODE FOR CARRYING OUT THE INVENTION

Figure 1:
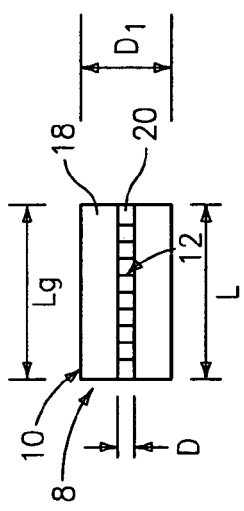
FIG. 1 is a side view of an optical identification element, in accordance with the present invention.

Referring to FIG. 1, an optical identification element 8 comprises a known optical substrate 10, having an optical diffraction grating 12 disposed (or written, impressed, embedded, imprinted, etched, grown, deposited or otherwise formed) in the volume of or on a surface of a substrate 10. The grating 12 is a periodic or a periodic variation in the effective refractive index and/or effective optical absorption of at least a portion of the substrate 10.

The substrate 10 has an inner region 20 where the grating 12 is located. The inner region may be photosensitive to allow the writing or impressing of the grating 12. The substrate 10 has an outer region 18 which does not have the grating 12 therein.

The grating 12 is a combination of one or more individual spatial periodic sinusoidal variations in the refractive index that are collocated along the length of the grating region 20 of the substrate 10, each having a spatial period (or pitch) $\Lambda$. The grating 12 (or a combination of gratings) represents a unique optically readable code, made up of bits. In one embodiment, a bit corresponds to a unique pitch $\Lambda$ within the grating 12.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 comprises silica glass ($SiO_2$) having the appropriate chemical composition to allow the grating 12 to be disposed therein or thereon. Other materials for the optical substrate 10 may be used if desired. For example, the substrate 10 may be made of any glass, e.g., silica, phosphate glass, borosilicate glass or other glasses, or made of glass and plastic, or solely plastic. For high temperature or harsh chemical applications, the optical substrate 10 made of a glass material is desirable. If a flexible substrate is needed, a plastic, rubber or polymer-based substrate may be used. The optical substrate 10 may be any material capable of having the grating 12 disposed in the grating region 20 and that allows light to pass through it to allow the code to be optically read.

The optical substrate 10 with the grating 12 has a length L and an outer diameter D1, and the inner region 20 diameter D. The length L can range from very small (about 1–1000 microns or smaller) to large (about 1.0–1000 mm or greater).

In addition, the outer dimension D1 can range from small (less than 1000 microns) to large (1.0–1000 mm and greater). Other dimensions and lengths for the substrate 10 and the grating 12 may be used.

Figure 11:
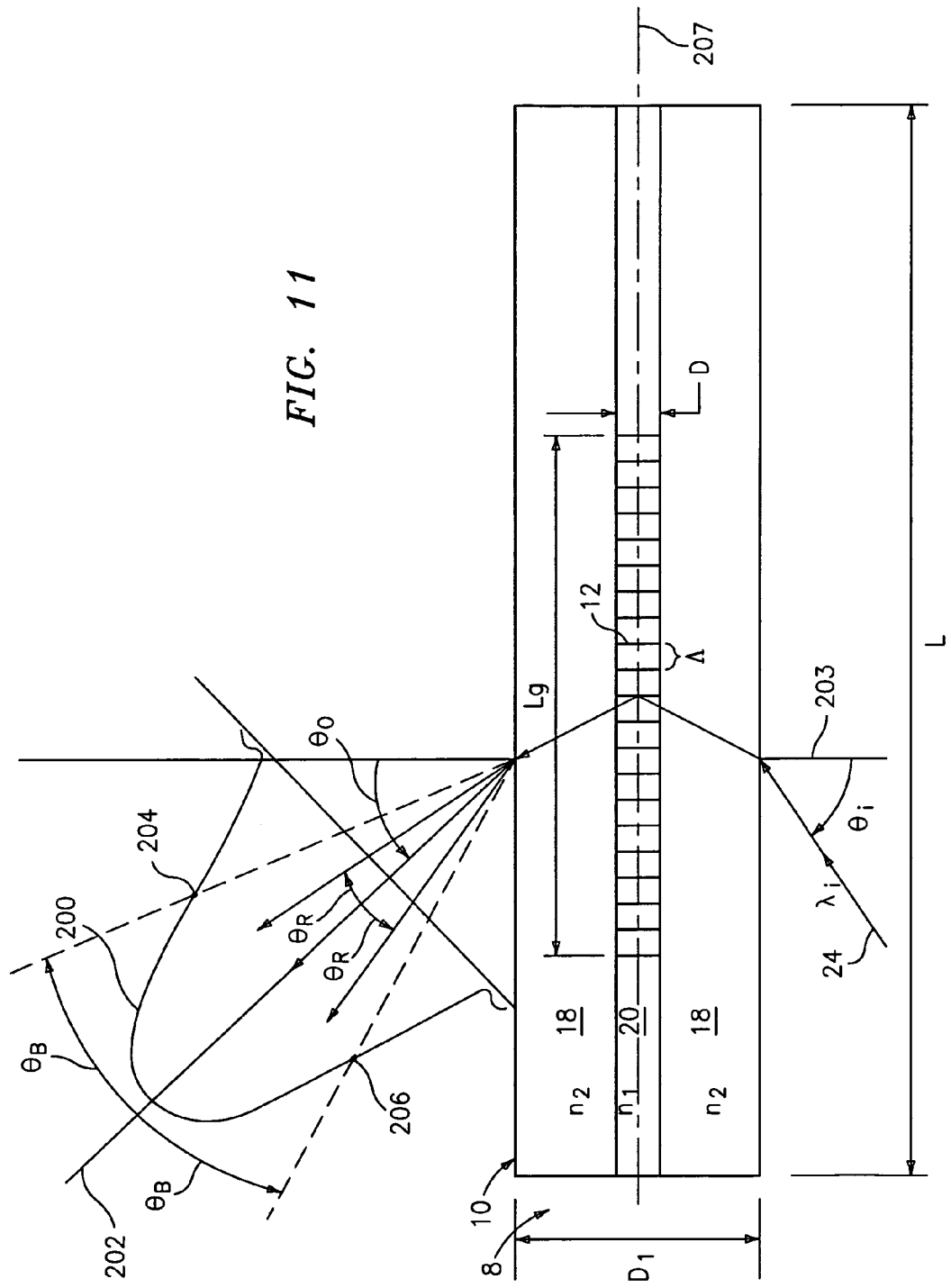
FIG. 11 is a side view of an optical identification element and optics associated therewith, in accordance with the present invention.

The grating 12 may have a length Lg of about the length L of the substrate 10. Alternatively, the length Lg of the grating 12 may be shorter than the total length L of the substrate 10, as shown in FIG. 11.

Figure 44:
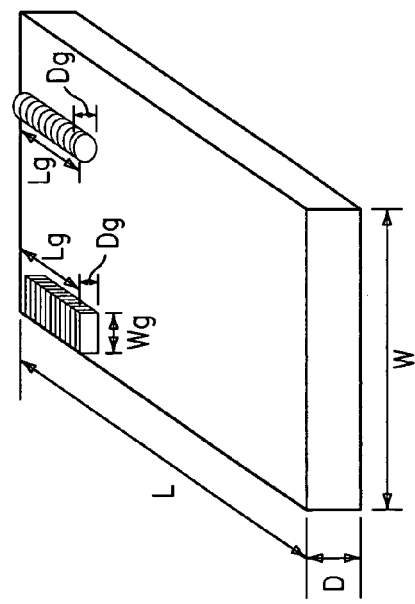
FIG. 44 is a perspective view of an optical identification element having a grating that is smaller than the substrate, in accordance with the present invention.

Moreover, referring to FIG. 44, the size of any given dimension for the region 20 of the grating 12 may be less than any corresponding dimension of the substrate 10. For example, if the grating 12 has dimensions of length Lg, depth Dg, and width Wg, and the substrate 12 has dimensions of length L, depth D, and width W, the dimensions of the grating 12 may be less than that of the substrate 12. Thus, the grating 12, may be embedded within or part of a much larger substrate 12. Instead of rectangular dimensions or coordinates for size of the substrate 10, the element 8, or the grating 12, other dimensions/coordinates for size may be used, e.g., polar or vector dimensions.

Also, the element 8 may be embedded or formed in or on a larger object for identification of the object.

The substrate 10 may have end-view cross-sectional shapes other than circular, such as square, rectangular, elliptical, clam-shell, D-shaped, or other shapes, and may have side-view sectional shapes other than rectangular, such as circular, square, elliptical, clam-shell, D-shaped, or other shapes. Also, 3D geometries other than a cylinder may be used, such as a sphere, a cube, a pyramid, a bar, a slab, a plate, a brick, or a disc shape, or any other 3D shape. Alternatively, the substrate 10 may have a geometry that is a combination of one or more of the foregoing shapes.

The dimensions, geometries, materials, and material properties of the substrate 10 are selected such that the desired optical and material properties are met for a given application. The resolution and range for the optical codes are scalable by controlling these parameters (discussed more hereinafter).

The substrate 10 may be coated with a polymer material or other material that may be dissimilar to the material of the substrate 10, provided that the coating on at least a portion of the substrate, allows sufficient light to pass transversely through the substrate for adequate optical detection of the code using side illumination.

Figure 2:
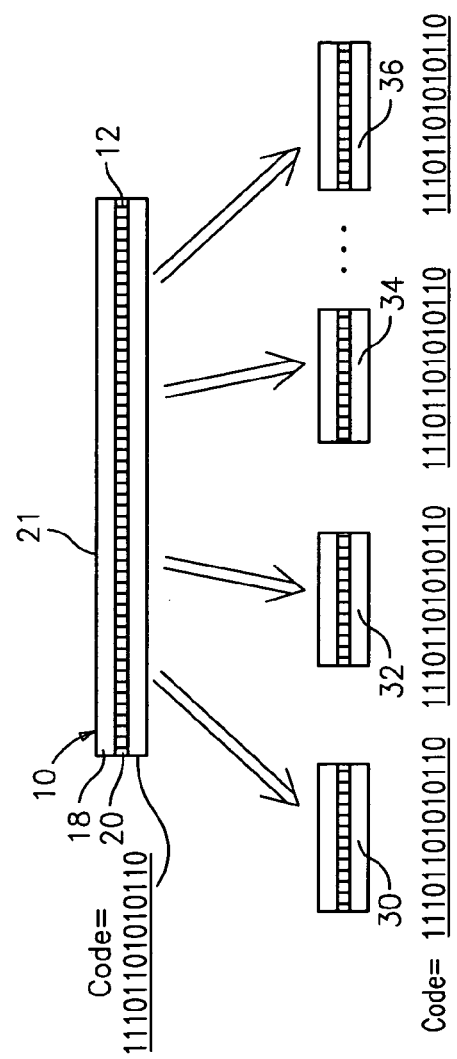
FIG. 2 is a side view of whole and partitioned optical identification element, in accordance with the present invention.

Referring to FIG. 2, the grating 12 is axially spatially invariant. As a result, the substrate 10 with the grating 12 (shown as a long substrate 21) may be axially subdivided or cut into many separate smaller substrates 30–36 and each substrate 30–36 will contain the same code as the longer substrate 21 had before it was cut. The limit on the size of the smaller substrates 30–36 is based on design and performance factors discussed hereinafter.

Referring to FIG. 1, the outer region 18 is made of pure silica ($SiO_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1,n2 for the grating region 20 and the outer region 18, respectively, may be used, if desired, provided the grating 12 can be impressed in the desired grating region 20. For example, the grating region 20 may have an index of refraction that is larger than that of the outer region 18 or grating region 20 may have the same index of refraction as the outer region 18 if desired.

Figure 3:
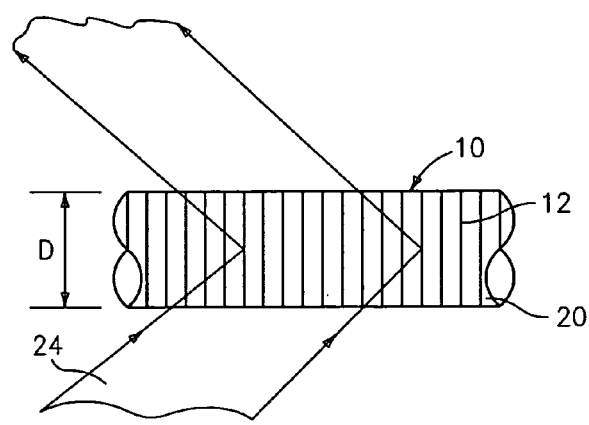
FIG. 3 is a side view of an optical identification element, in accordance with the present invention.
Figure 4:
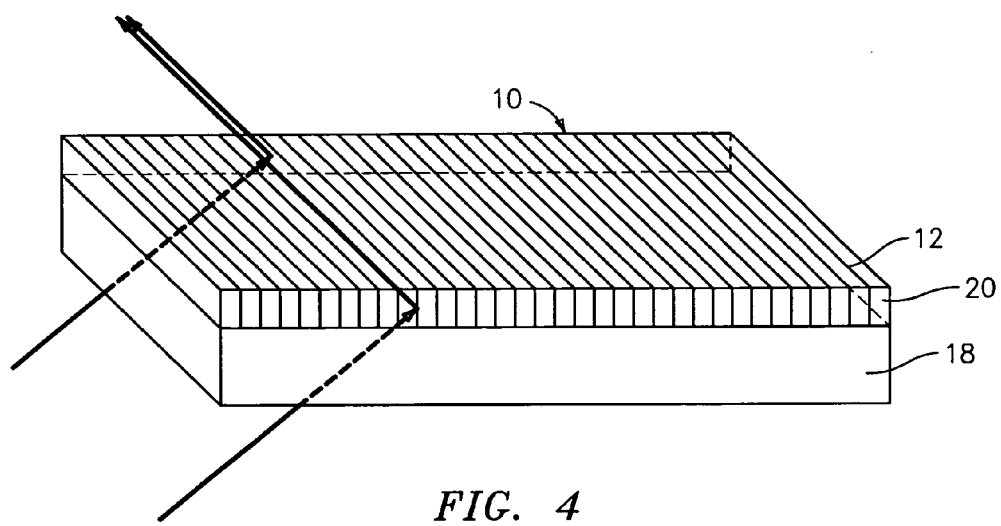
FIGS. 4 and 5 are perspective views of an optical identification element, in accordance with the present invention.
Figure 5:
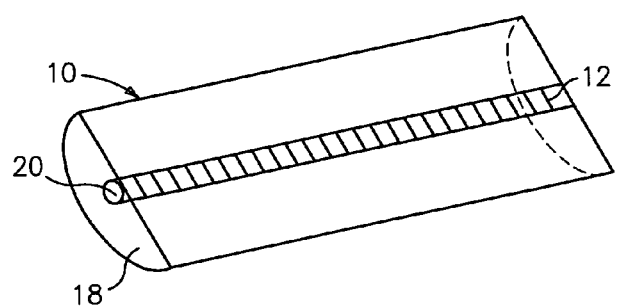

Referring to FIGS. 3, 4, and 5, one purpose of the outer region 18 (or region without the grating 12) of the substrate 10 is to provide mechanical or structural support for the inner grating region 20. Referring to FIG. 3, accordingly, the entire substrate 10 may comprise the grating 12, if desired. Referring to FIG. 4, alternatively, the support portion may be completely or partially beneath, above, or along one or more sides of the grating region 20, such as in a planar geometry (FIG. 4), or a D-shaped geometry (FIG. 5), or other geometries. The non-grating portion 18 of the substrate 10 may be used for other purposes as well, such as optical lensing effects or other effects (discussed hereinafter).

Also, the end faces of the substrate 10 need not be perpendicular to the sides or parallel to each other. However, for applications where the elements 8 are stacked end-to-end, the packing density may be optimized if the end faces are perpendicular to the sides.

Figure 6:
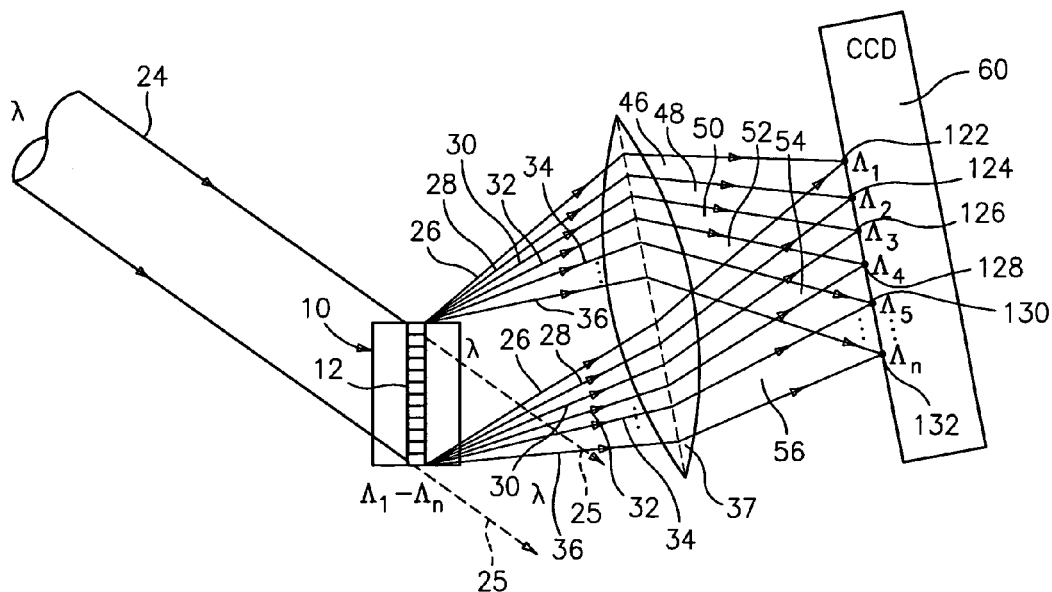
FIG. 6 is a side view of an optical identification element showing one optical reading embodiment, in accordance with the present invention.

Referring to FIG. 6, an incident light 24 of a wavelength λ, e.g., 532 nm from a known frequency doubled Nd:YAG laser or 632 nm from a known Helium-Neon laser, is incident on the grating 12 in the substrate 10. Any other input wavelength λ can be used if desired provided λ is within the optical transmission range of the substrate (discussed more hereinafter).

A portion of the input light 24 passes straight through the grating 12 as indicated by dashed lines 25. The remainder of the light 24 is reflected by the grating 12 and forms a plurality of beams 26–36 (collectively referred to as reflected light 27), each having the same wavelength λ as the input wavelength λ and each having a different angle indicative of the pitches (Λ1–Λn) existing in the grating 12.

As discussed hereinbefore, the grating 12 is a combination of one or more individual sinusoidal spatial periods or pitches Λ of the refractive index variation along the substrate, each collocated at substantially the same location on the substrate 10 (discussed more hereinafter). The resultant combination of these individual pitches is the grating 12 comprising spatial periods (Λ1–Λn) each representing a bit in the code. Accordingly, the code is determined by which spatial periods (Λ1–Λn) exist (or do not exist) in a given composite grating 12. The code may also be determined by additional parameters as well, as discussed hereinafter.

The reflected light 26–36 passes through a lens 37, which provides focused light beams 46–56 which are imaged onto a CCD camera 60 as indicated by reference numerals 122, 124, 126, 128, 130 and 130. Instead of or in addition to the lens 37, other imaging optics may be used to provide the desired characteristics of the optical image/signal onto the camera 60 (e.g., spots, lines, circles, ovals, etc.), depending on the shape of the substrate and input optical signals. Also, instead of a CCD camera other devices may be used to read/capture the output light.

Figure 7:
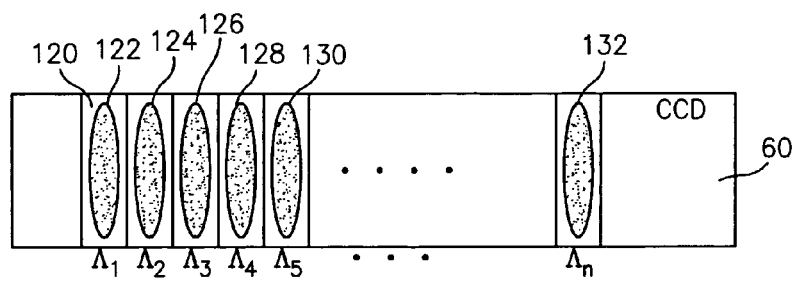
FIG. 7 is an image on a CCD camera of FIG. 6, in accordance with the present invention.

Referring to FIG. 7, the image 122, 124, 126, 128, 130 and 132 on the CCD camera 60 is a series of illuminated stripes 120 indicating ones and zeros of a digital pattern or code of the grating 12 in the element 8.

Figure 8:
FIG. 8 is a graph showing an digital representation of bits in a code derived from the image of FIG. 7, in accordance with the present invention.

Referring to FIG. 8, lines 68 on a graph 70 are indicative of a digitized version of the image of FIG. 7 as indicated in spatial periods (Λ1–Λn).

Each of the individual spatial periods (Λ1–Λn) in the grating 12 is slightly different, thus producing an array of N unique diffraction conditions (or diffraction angles) discussed more hereinafter. When the element 8 is illuminated from the side, in the region of the grating 12, at the appropriate angle (discussed hereinafter), with a single input wavelength λ (monochromatic) source, the diffracted (or reflected) beams 26–36 are generated.

The beams 26–36 are imaged onto the CCD camera 60 to produce a pattern of light and dark regions representing a digital (or binary) code, where light=1 and dark=0 (or vice versa). The digital code may be generated by selectively creating individual index variations (or individual gratings) with the desired spatial periods Λ1–Λn.

Referring to FIG. 9, illustrations (a)–(c), for the grating 12 in a cylindrical substrate 10 having a sample spectral 17 bit code (i.e., 17 different pitches Λ1–Λ17), the corresponding image on the CCD (Charge Coupled Device) camera 60 is shown for a digital pattern of 17 bit locations 89, including FIG. 9. illustrations (b), (c) and (d), respectively, for 7 bits turned on (10110010001001001); 9 bits turned on of (11000101010100111); and all 17 bits turned on of (11111111111111111).

For the images in FIG. 9, the length of the substrate 10 was 450 microns, the outer diameter D1 was 65 microns, the inner diameter D was 14 microns, δn for the grating 12 was about $10^{-4}$, n1 in portion 20 was about 1.458 (at a wavelength of about 1550 nm), n2 in portion 18 was about 1.453, the average pitch spacing Λ for the grating 12 was about 0.542 microns, and the spacing between pitches ΔΛ was about 0.36% of the adjacent pitches Λ.

Figure 10:
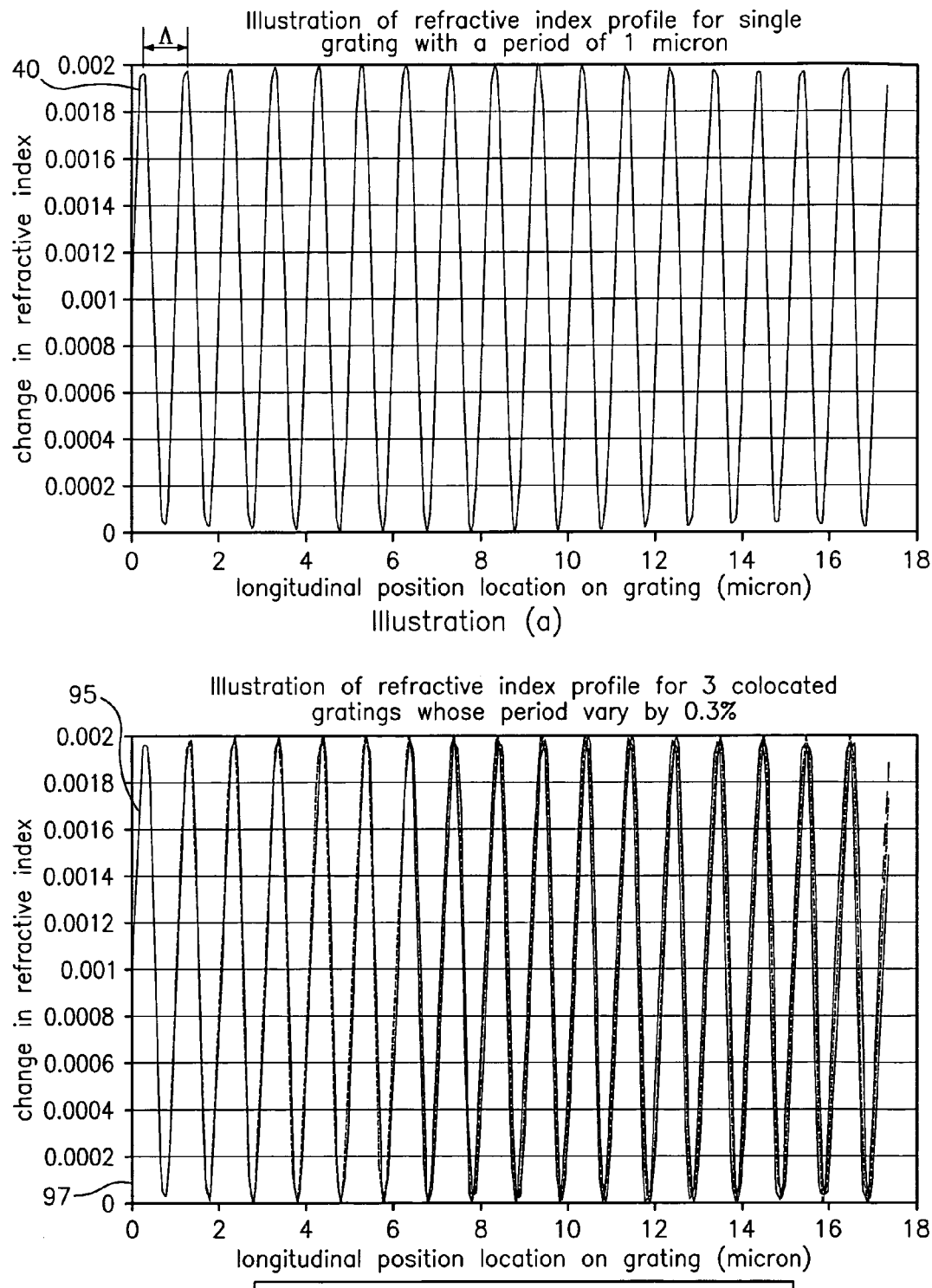
FIG. 10 illustrations (a)–(d) show graphs of different refractive index pitches and a summation graph, in accordance with the present invention.
Figure 10:
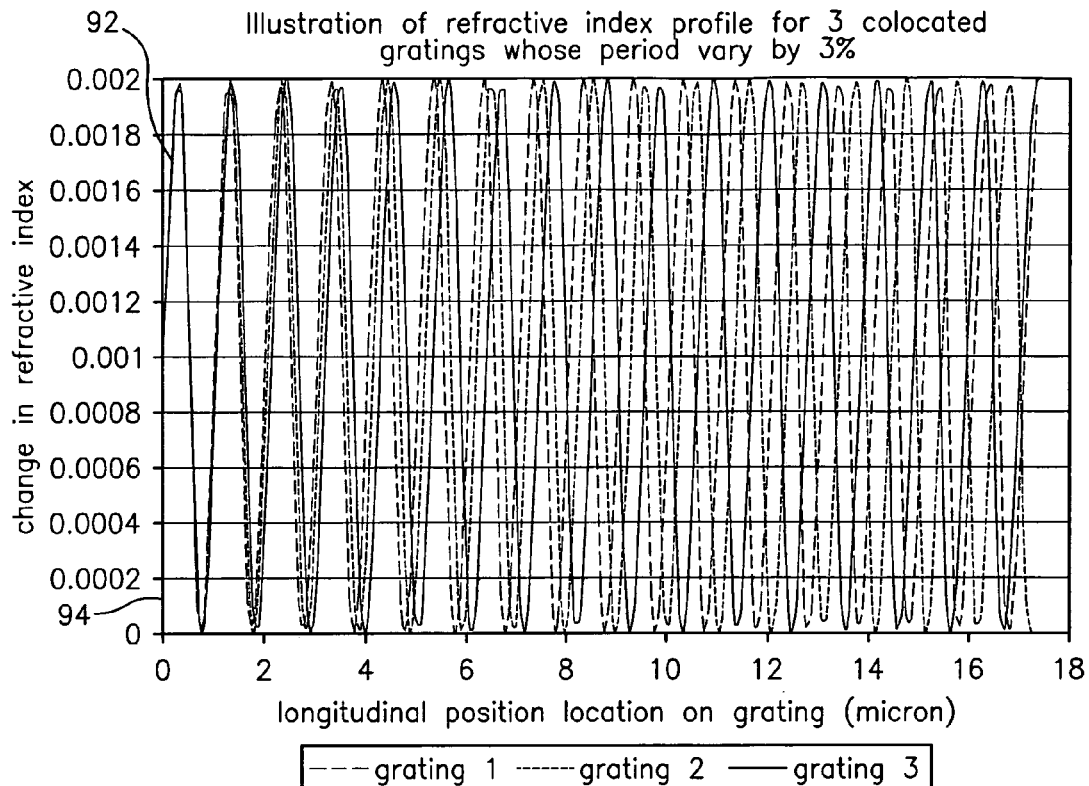
Figure 10:
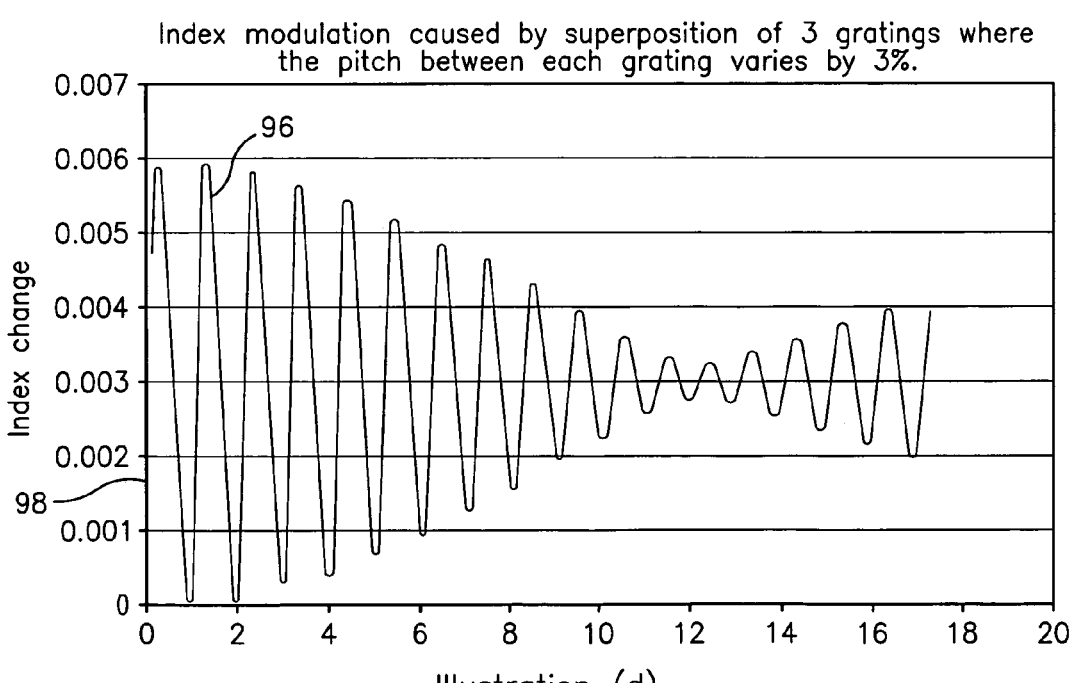

Referring to FIG. 10, illustration (a), the pitch Λ of an individual grating is the axial spatial period of the sinusoidal variation in the refractive index n1 in the region 20 of the substrate 10 along the axial length of the grating 12 as indicated by a curve 90 on a graph 91. Referring to FIG. 10, illustration (b), a sample composite grating 12 comprises three individual gratings that are co-located on the substrate 10, each individual grating having slightly different pitches, Λ1, Λ2, Λ3, respectively, and the difference (or spacing) ΔΛ between each pitch Λ being about 3.0% of the period of an adjacent pitch Λ as indicated by a series of curves 92 on a graph 94. Referring to FIG. 10, illustration (c), three individual gratings, each having slightly different pitches, Λ1, Λ2, Λ3, respectively, are shown, the difference ΔΛ between each pitch Λ being about 0.3% of the pitch Λ of the adjacent pitch as shown by a series of curves 95 on a graph 97. The individual gratings in FIG. 9, illustrations (b) and (c) are shown to all start at 0 for illustration purposes; however, it should be understood that, the separate gratings need not all start in phase with each other. Referring to FIG. 10, illustration (d), the overlapping of the individual sinusoidal refractive index variation pitches Λ1–Λn in the grating region 20 of the substrate 10, produces a combined resultant refractive index variation in the composite grating 12 shown as a curve 96 on a graph 98 representing the combination of the three pitches shown in FIG. 9, illustration (b). Accordingly, the resultant refractive index variation in the grating region 20 of the substrate 10 may not be sinusoidal and is a combination of the individual pitches Λ (or index variation).

Referring to FIG. 11, to read codes of the grating 12, the light must be efficiently reflected (or diffracted or scattered) off the grating 12. As is known, two conditions must be met for light to be efficiently reflected. First, the diffraction condition for the grating 12 must be satisfied. This condition, as is known, is the diffraction (or reflection or scatter) relationship between input wavelength λ, input incident angle θi, output incident angle θo, and the spatial period Λ of the grating 12, and is governed by the below equation:

$$\sin(\theta_i)+\sin(\theta_o)=m\lambda/n\Lambda \qquad \text{Eq. 1}$$

where m is the "order" of the reflection being observed, and n is the refractive index of the substrate 10. For FIG. 11, the input angle θi and the output angle θo are defined as outside the cylinder substrate 10. The value of m=1 or first order reflection is acceptable for illustrative purposes. Eq. 1 applies to light incident on outer surfaces of the substrate 10 which are parallel to the longitudinal axis of the grating (or the $k_B$ vector), or where a line 203 normal to the outer surface is perpendicular to the $k_B$ vector. Because the angles θi,θo are defined outside the substrate 10 and because the effective refractive index of the substrate 10 is substantially a common value, the value of n in Eq. 1 cancels out of this equation.

Thus, for a given input wavelength λ, grating spacing Λ, and incident angle of the input light θi, the angle θo of the reflected output light may be determined. Solving Eq. 1 for θo and plugging in m=1, gives:

$$\theta o=\sin^{-1}(\lambda/\Lambda-\sin(\theta i)) \qquad \text{Eq. 2}$$

For example, for an input wavelength λ=532 nm, a grating spacing Λ=0.532 microns (or 532 nm), and an input angle of incidence θi=30 degrees, the output angle of reflection will be θo=30 degrees. Alternatively, for an input wavelength λ=632 nm, a grating spacing Λ=0.532 microns (or 532 nm), and an input angle θi of 30 degrees, the output angle of reflection θo will be at 43.47 degrees, or for an input angle θi=37 degrees, the output angle of reflection will be θo=37 degrees.

Referring to Table 1 below, for an input wavelength of λ=532 nm and an input angle θi=30 Degrees, for given grating pitches Λ, the output angle θo is shown.

TABLE 1

| Number | Λ (microns) | $\theta_o$ |
|---|---|---|
| 1 | 0.5245 | 30.95 |
| 2 | 0.5265 | 30.69 |
| 3 | 0.529 | 30.38 |
| 4 | 0.5315 | 30.06 |
| 5 | 0.5335 | 29.81 |
| 6 | 0.536 | 29.51 |
| 7 | 0.538 | 29.27 |
| 8 | 0.54 | 29.03 |
| 9 | 0.542 | 28.79 |
| 10 | 0.5445 | 28.49 |
| 11 | 0.5465 | 28.26 |
| 12 | 0.549 | 27.97 |
| 13 | 0.551 | 27.74 |
| 14 | 0.5535 | 27.46 |
| 15 | 0.555 | 27.29 |
| 16 | 0.5575 | 27.02 |
| 17 | 0.5595 | 26.80 |

The second condition for reading the output light is that the reflection angle $\theta_o$ of the output light must lie within an acceptable region of a "Bragg envelope" 200 to provide an acceptable level of output light. The Bragg envelope defines the reflection (or diffraction or scatter) efficiency of incident light. The Bragg envelope has a center (or peak) on a center line 202 where refection efficiency is greatest (which occurs when $\theta_i=\theta_o$—discussed hereinafter), and it has a half-width ($\theta_B$) measured in degrees from the center line 202 or a total width ($2\theta_B$). For optimal or most efficient reflection, the output light path angle $\theta_o$ should be at the center of the Bragg envelope.

In particular, for an input light beam incident on a cylinder in a plane defined by the longitudinal axis 207 of the cylinder and the line 203 normal to the longitudinal axis of the cylinder, the equation governing the reflection or scattering efficiency (or normalized reflection intensity) profile for the Bragg envelope is approximately:

$$I(k_i, k_o) \approx [KD]^2 \operatorname{sinc}^2\left[\frac{(k_i - k_o)D}{2}\right]$$ Eq. 3 where $K=2\pi\delta n/\lambda$, where, $\delta n$ is the local refractive index modulation amplitude of the grating and $\lambda$ is the input wavelength, $\operatorname{sinc}(x)=\sin(x)/x$, and the vectors $k_i=2\pi\cos(\theta_i)/\lambda$ and $k_o=2\pi\cos(\theta_o)/\lambda$ are the projections of the incident light and the output (or reflected) light, respectively, onto the line 203 normal to the axial direction of the grating 12 (or the grating vector $k_B$), D is the thickness or depth of the grating 12 as measured along the line 203 (normal to the axial direction of the grating 12). Other substrate shapes than a cylinder may be used and will exhibit a similar peaked characteristic of the Bragg envelope. We have found that a value for $\delta n$ of about $10^{-4}$ in the grating region of the substrate is acceptable; however, other values may be used if desired.

Rewriting Eq. 3 gives the reflection efficiency profile of the Bragg envelope as:

$$I(k_i, k_o) \approx \left[\frac{2\pi \cdot \delta n \cdot D}{\lambda}\right]^2 \left[\frac{\sin(x)}{x}\right]^2$$ Eq. 4 where: $x=(k_i-k_o)D/2=(\pi D/\lambda)*(\cos\theta_i-\cos\theta_o)$

Thus, when the input angle $\theta_i$ is equal to the output (or reflected) angle $\theta_o$ (i.e., $\theta_i=\theta_o$), the reflection efficiency I (Eqs. 3 & 4) is maximized, which is at the center or peak of the Bragg envelope. When $\theta_i=\theta_o$, the input light angle is referred to as the Bragg angle as is known. The efficiency decreases for other input and output angles (i.e., $\theta_i \neq \theta_o$), as defined by Eqs. 3 & 4. Thus, for maximum reflection efficiency and thus output light power, for a given grating pitch $\Lambda$ and input wavelength, the angle $\theta_i$ of the input light 24 should be set so that the angle $\theta_o$ of the reflected output light equals the input angle $\theta_i$. An example of a sinc² function of Eq. 3 of the reflection efficiency associated with the Bragg envelope is shown as the line 200.

Also, as the thickness or diameter D of the grating decreases, the width of the $\sin(x)/x$ function (and thus the width of the Bragg envelope) increases and, the coefficient to or amplitude of the sinc² (or $(\sin(x)/x)^2$ function (and thus the efficiency level across the Bragg envelope) also increases, and vice versa. Further, as the wavelength $\lambda$ increases, the half-width of the Bragg envelope as well as the efficiency level across the Bragg envelope both decrease. Thus, there is a trade-off between the brightness of an individual bit and the number of bits available under the Bragg envelope. Ideally, $\delta n$ should be made as large as possible to maximize the brightness, which allows D to be made smaller.

From Eq. 3 and 4, the half-angle of the Bragg envelope $\theta_B$ is defined as:

$$\theta_B = \frac{\eta\lambda}{\pi D \sin(\theta_i)}$$ Eq. 5 where $\eta$ is a reflection efficiency factor which is the value for x in the sinc²(x) function where the value of sinc²(x) has decreased to a predetermined value from the maximum amplitude as indicated by points 204, 206 on the curve 200.

While an output light angle $\theta_o$ located at the center of the Bragg envelope provide maximum reflection efficiency, output angle within a predetermined range around the center of the Bragg envelope provide sufficient level of reflection efficiency.

We have found that the reflection efficiency is acceptable when $\eta \leq 1.39$. This value for $\eta$ corresponds to when the amplitude of the reflected beam (i.e., from the sinc²(x) function of Eqs. 3 & 4) has decayed to about 50% of its peak value. In particular, when $x=1.39=\eta$, sinc²(x)=0.5. However, other values for efficiency thresholds or factor in the Bragg envelope may be used if desired.

It is known that a focused light beam diverges beyond its focal point at a divergence half-angle $\theta_R$, which is defined as:

$$\theta_R = \lambda/(\pi w)$$ Eq. 6 where $\lambda$ is the wavelength of the light and w is the beam half-width (HW) at the focal point (or "beam waist") measured at the point of $1/e^2$ of the peak beam intensity (for a Gaussian beam). The beam half-width w is determined at the point of incidence on the element 8. As the beam width w decreases, the divergence angle increases (and vice versa). Also, as the wavelength $\lambda$ of light increases, the beam divergence angle $\theta_R$ also increases.

Portions of the above discussion of side grating reflection and the Bragg effect is also described in Krug P., et al, "Measurement of Index Modulation Along an Optical Fiber Bragg Grating", Optics Letters, Vol. 20 (No. 17), pp. 1767–1769, September 1995, which are incorporated herein by reference.

Referring to FIGS. 12, 13 & 16, we have found that the outer edges of the substrate 10 may scatter the input light from the incident angle into the output beam angular space, which may degrade the ability to read the code from the reflected output light. To minimize this effect, the beam width 2w should be less than the outer dimensions of the substrate 10 by a predetermined beam width factor $\beta$, e.g., about 50% to 80% for each dimension. Thus, for a cylinder, the beam should be shorter than the longitudinal length L in the axial dimension (side view) and narrower than the diameter of the cylinder in the cross-sectional dimension (end view). Accordingly, for a cylinder substrate 10, the input beam 24 may have a non-circular cross-section. In that case, the beam 24 half-width w will have a half-width dimension w1 along one dimension (e.g., the length) of the grating 12 and a half-width dimension w2 along the other dimension (e.g., the cross-sectional diameter) of the grating 12. Other spot sizes may be used if desired, depending on the amount of end scatter that can be tolerated by the application (discussed more hereinafter).

The beam width factor $\beta$ thus may be defined as the ratio of the full width (2w) of the incident beam (along a given axis) to the length L of the substrate 10 as follows:

$$\beta = 2w/L$$ Eq. 7

For example, when the full beam width 2w is 50% of the length of the substrate 10, the factor $\beta$ has a value of 0.5.

Accordingly, the divergence equation may be rewritten in terms of the substrate length L and the beam width factor $\beta$ as:

$$\theta_R = \lambda/(\pi w) = 2\lambda/(\pi\beta L)$$ Eq. 8

For example, for a substrate having an overall length L of about 400 microns, having the grating 12 length Lg along its entire length L, the half-width w1 of the incident beam along the grating length L may be about 100–150 microns to avoid end scatter effects. Similarly, for a substrate 12 having an outer diameter of about 65 microns and a grating region 20 diameter of about 10 microns, the other half-width w2 of the incident beam 24 may be about 15 microns. Other spot dimensions may be used if desired, depending on the amount of end scatter that can be tolerated by the application.

In view of the foregoing, the number of bits N, which is equal to the number of different grating pitches Λ (and hence the number of codes), that can be accurately read (or resolved) using side-illumination and side-reading of the grating 12 in the substrate 10 is determined by numerous factors, including: the beam width w incident Oil the substrate (and the corresponding substrate length L and grating length Lg), the thickness or diameter D of the grating 12, the wavelength λ of incident light, the beam divergence angle $\theta_R$, and the width of the Bragg envelope $\theta_B$. Note that in FIG. 11 both the Bragg envelope $\theta_B$ and the beam divergence $\theta_R$ are defined as half angles from a central line.

Thus, the maximum number of resolvable bits N for a given wavelength is approximately as shown below.

$$N \cong \frac{\theta_B}{\theta_R} \qquad \text{Eq. 9}$$

plugging in for $\theta_B$ and $\theta_R$ from Eqs. 5 and 8, respectively, gives:

$$N \cong \frac{\eta \beta L}{2D \sin(\theta_i)} \qquad \text{Eq. 10}$$

Table 2 below shows values of number of bits N, for various values of the grating thickness D in microns and substrate length L in microns (the length Lg of the grating 12 is the same as the length L of the substrate—the grating length Lg controls), for θi=30 degrees and p=0.5.

TABLE 2

| | Grating Thickness D (microns) => | | | |
|---|---|---|---|---|
| | 7 | 10 | 20 | 30 |
| Substrate Length L | | | | |
| (microns) ⇓ | N | N | N | N |
| 5 | 0 | 0 | 0 | 0 |
| 20 | 2 | 1 | 1 | 0 |
| 50 | 5 | 3 | 2 | 1 |
| 100 | 10 | 7 | 3 | 2 |
| 200 | 20 | 14 | 7 | 5 |
| 400 | 40 | 28 | 14 | 9 |
| 500 | 50 | 35 | 17 | 12 |
| 1000 | 99 | 70 | 35 | 23 |

As seen from Table 2, and shown by the equations discussed hereinbefore, as the grating thickness or depth D is made smaller, the Bragg envelope θB increases and, thus, the number of bits N increases. Also, as the length of the grating Lg gets shorter (and thus the beam width gets smaller), the number of bits N decreases, as the divergence angle $\theta_R$ increases for each bit or pitch Λ. Accordingly, the number of bits N is limited to the number of bits that can fit within the Bragg envelope ($2\theta_B$).

Figure 18:
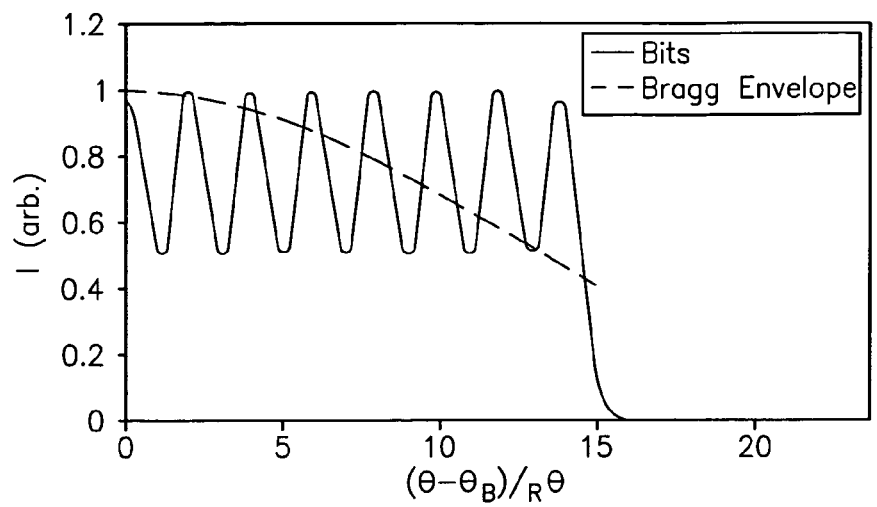
FIG. 18 is a graph of a plurality of bits within a Bragg envelope of an optical identification element, in accordance with the present invention.

Referring to FIG. 18, an example of the Bragg envelope half-width ($\theta_B$) is shown for an input wavelength λi=532 nm, an input angle θi=30 degrees, a grating thickness D=20 microns, a beam half-width w=150 microns, corresponding to a total of 15 bits across the entire Bragg envelope ($2\theta_B$) separated in angular space by 2 half-widths.

It should be understood that depending on the acceptable usable Bragg envelope $\theta_B$ relating to acceptable reflection efficiency discussed hereinbefore, the achievable number of bits N may be reduced from this amount, as discussed hereinbefore.

Also, it should be understood that Eq. 5 is based on the beam spacing in the "far field". Thus, even though the output beams may overlap near to the substrate (i.e., in the "near field"), if the lens 37 is placed in the near field it will separate out the individual beams and provide separately resolved beams having a desired spot size to provide an effective far field effect shown by Eq. 5. Alternatively, the beams may be optically detected in the far field without the lens 37, or with other imaging optics as desired.

Referring to FIGS. 12 & 13, in addition, the outer diameter D1 of the substrate 10 affects how much power is scattered off the ends of the substrate 10. In particular, even if the HW beam size is within the outer edges of the substrate 10, the intensity fringes outside the HW point on the incident beam 24 may reflect off the front or rear faces of the substrate 10 toward the output beam. Therefore, the smaller the outer diameter D1 of the substrate, the smaller the amount of unwanted beam scatter. Alternatively, certain edges of the substrate may be bowed (see FIG. 17) or angled or otherwise have a geometry that minimizes such scatter or the ends may be coated with a material that minimizes scatter.

Figure 15:
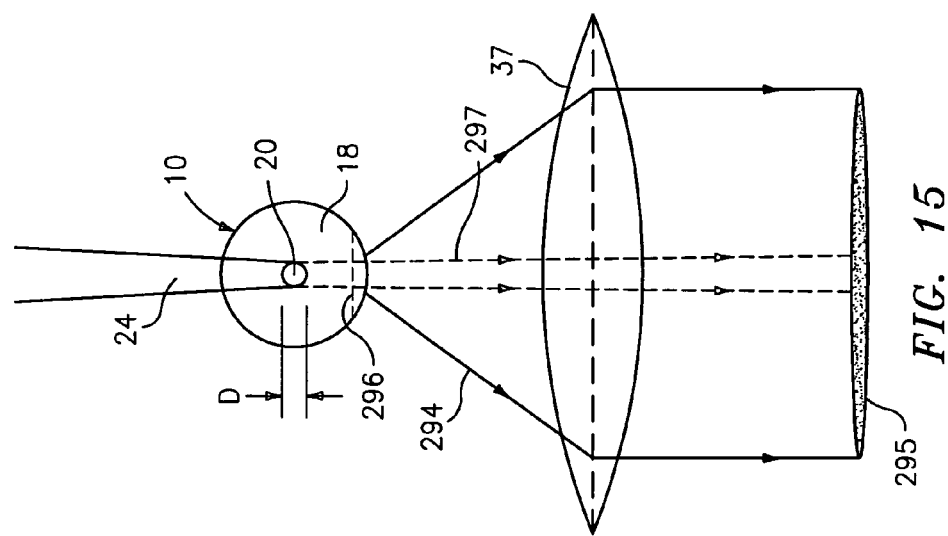

Referring to FIG. 15, the circular outer surface of the cylindrical substrate 10 causes a convex lensing effect which spreads out the reflected light beams as indicated by a line 294. The lens 37 collimates the reflected light 294 which appears as a line 295. If the bottom of the substrate 10 was flat as indicated by a line 296 instead of curved (convex), the reflected light beam would not be spread out in this dimension, but would substantially retain the shape of the incident light (accounting for beam divergence), as indicated by dashed lines 297. In that case, the output light would be spots or circles instead of lines.

Figure 14:
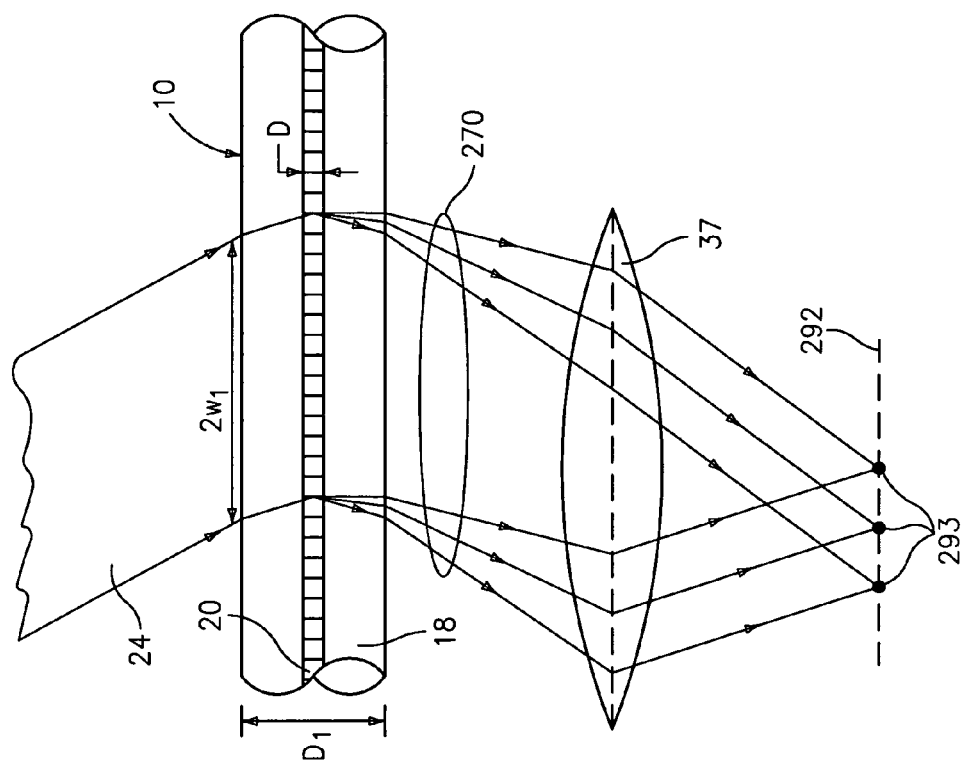

Referring to FIG. 14, in the side view, the lens 37 focuses the reflected light 290 to a point or spot having a diameter of about 30 microns (full width, at the $1/e^2$ intensity point) for a 65 micron diameter substrate. The lens 37 focuses the reflected light onto different spots 293 along a line 292.

Figure 19:
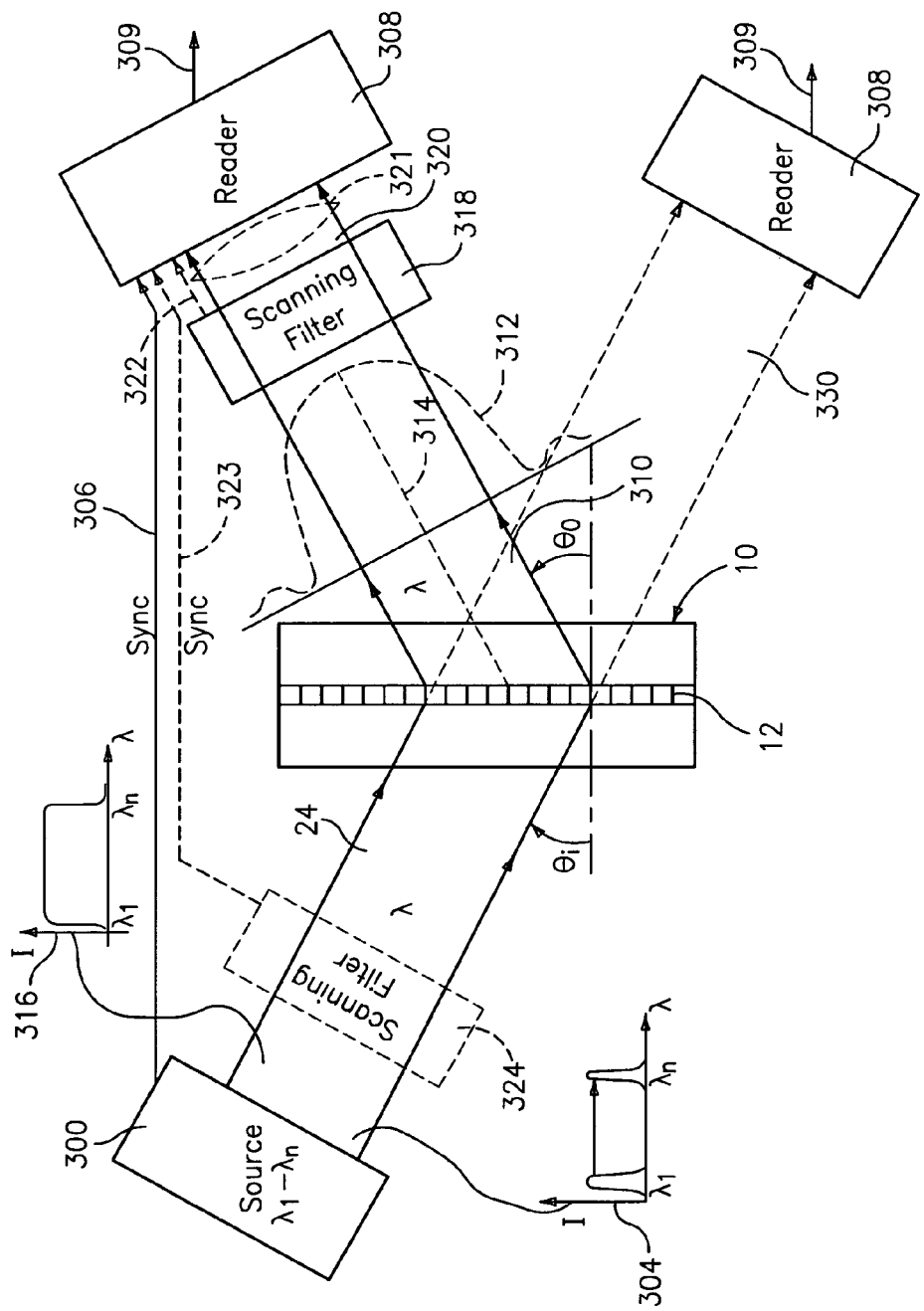
FIG. 19 shows an alternative optical schematic for reading a code in an optical identification element, in accordance with the present invention.

Referring to FIG. 19, instead of having the input light 24 at a single wavelength λi (monochromatic) and reading the bits by the angle θo of the output light, the bits (or grating pitches Λ) may be read/detected by providing a plurality of wavelengths and reading the wavelength spectrum of the reflected output light signal. In this case, there would be one bit per wavelength, and thus, the code is contained in the wavelength information of the reflected output signal.

In this case, each bit (or Λ) is defined by whether its corresponding wavelength falls within the Bragg envelope, not by its angular position within the Bragg envelope. As a result, it is not limited by the number of angles that can fit in the Bragg envelope for a given composite grating 12, as in the embodiment discussed hereinbefore. Thus, using multiple wavelengths, the only limitation in the number of bits N is the maximum number of grating pitches Λ that can be superimposed and optically distinguished in wavelength space for the output beam.

Figure 56:
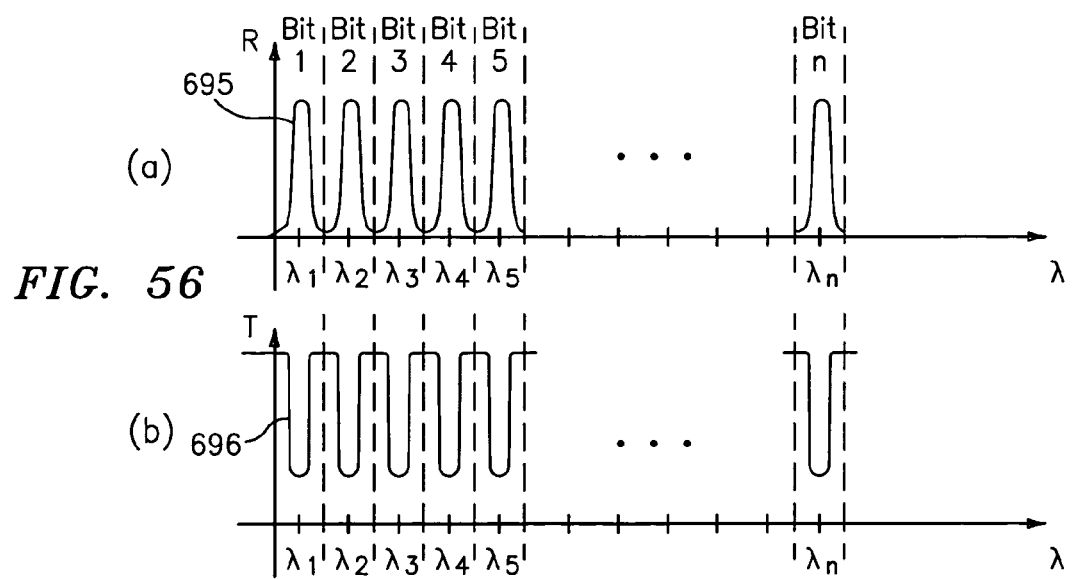
FIG. 56 illustrations (a)–(b) are graphs of reflection and transmission wavelength spectrum for an optical identification element, in accordance with the present invention.

Referring to FIGS. 19 and 56, illustration (a), the reflection wavelength spectrum (λ1–λn) of the reflected output beam 310 will exhibit a series of reflection peaks 695, each appearing at the same output Bragg angle θo. Each wavelength peak 695 (λ1–λn) corresponds to an associated spatial period (Λ1–Λn), which make up the grating 12.

One way to measure the bits in wavelength space is to have the input light angle θi equal to the output light angle θo, which is kept at a constant value, and to provide an input wavelength λ that satisfies the diffraction condition (Eq. 1) for each grating pitch Λ. This will maximize the optical power of the output signal for each pitch Λ detected in the grating 12.

Referring to FIG. 56, illustration (b), the transmission wavelength spectrum of the transmitted output beam 330 (which is transmitted straight through the grating 12) will exhibit a series of notches (or dark spots) 696. Therefore, instead of detecting the reflected output light 310, the transmitted light 330 may be detected at the detector/reader 308. Alternatively, the detector/reader 308 may read the both the transmitted light 25 and the reflected light 310. It should be understood that the optical signal levels for the reflection peaks 695 and transmission notches 696 will depend on the "strength" of the grating 12, i.e., the magnitude of the index variation n in the grating 12.

In FIG. 19, the bits may be detected by continuously scanning the input wavelength. A known optical source 300 provides the input light signal 24 of a coherent scanned wavelength input light shown as a graph 304. The source 300 provides a sync signal on a line 306 to a known reader 308. The sync signal may be a timed pulse or a voltage ramped signal, which is indicative of the wavelength being provided as the input light 24 to the substrate 10 at any given time. The reader 308 may be a photodiode, CCD camera, or other optical detection device that detects when an optical signal is present and provides an output signal on a line 309 indicative of the code in the substrate 10 or of the wavelengths present in the output light, which is directly related to the code, as discussed herein. The grating 12 reflects the input light 24 and provides an output light signal 310 to the reader 308. The wavelength of the input signal is set such that the reflected output light 310 through an optical lens 321 will be substantially in the center 314 of the Bragg envelope 312 for the individual grating pitch (or bit) being read.

Alternatively, the source 300 may provide a continuous broadband wavelength input signal such as that shown as a graph 316. In that case, the reflected output beam 310 signal is provided to a narrow band scanning filter 318 which scans across the desired range of wavelengths and provides a filtered output optical signal 320 to the reader 308. The filter 318 provides a sync signal on a line 322 to the reader, which is indicative of which wavelengths are being provided on the output signal 320 to the reader and may be similar to the sync signal discussed hereinbefore on the line 306 from the source 300. In this case, the source 300 does not need to provide a sync signal because the input optical signal 24 is continuous. Alternatively, instead of having the scanning filter being located in the path of the output beam 310, the scanning filter may be located in the path of the input beam 24 as indicated by the dashed box 324, which provides the sync signal on a line 323.

Alternatively, instead of the scanning filters 318,324, the reader 308 may be a known optical spectrometer (such as a known spectrum analyzer), capable of measuring the wavelength of the output light.

The desired values for the input wavelengths λ (or wavelength range) for the input signal 24 from the source 300 may be determined from the Bragg condition of Eq. 1, for a given grating spacing Λ and equal angles for the input light θi and the angle light θo. Solving Eq. 1 for λ and plugging in m=1, gives:

$$\lambda = \Lambda[\sin(\theta o) + \sin(\theta i)] \qquad \text{Eq. 11}$$

Referring to Table 3 below, for θi=θo=30 degrees, the above equation reduces to λ=Λ. Thus, for given grating pitches Λ, the corresponding values of the input (and associated output) wavelength λ are shown in Table 3.

TABLE 3

| Number | Λ (microns) | λ (nm) |
|---|---|---|
| 1 | 0.5245 | 524.5 |
| 2 | 0.5265 | 526.5 |
| 3 | 0.529 | 529 |
| 4 | 0.5315 | 531.5 |
| 5 | 0.5335 | 533.5 |
| 6 | 0.536 | 536 |
| 7 | 0.538 | 538 |
| 8 | 0.54 | 540 |
| 9 | 0.542 | 542 |
| 10 | 0.5445 | 544.5 |
| 11 | 0.5465 | 546.5 |
| 12 | 0.549 | 549 |
| 13 | 0.551 | 551 |
| 14 | 0.5535 | 553.5 |
| 15 | 0.555 | 555 |
| 16 | 0.5575 | 557.5 |
| 17 | 0.5595 | 559.5 |

Figure 20:
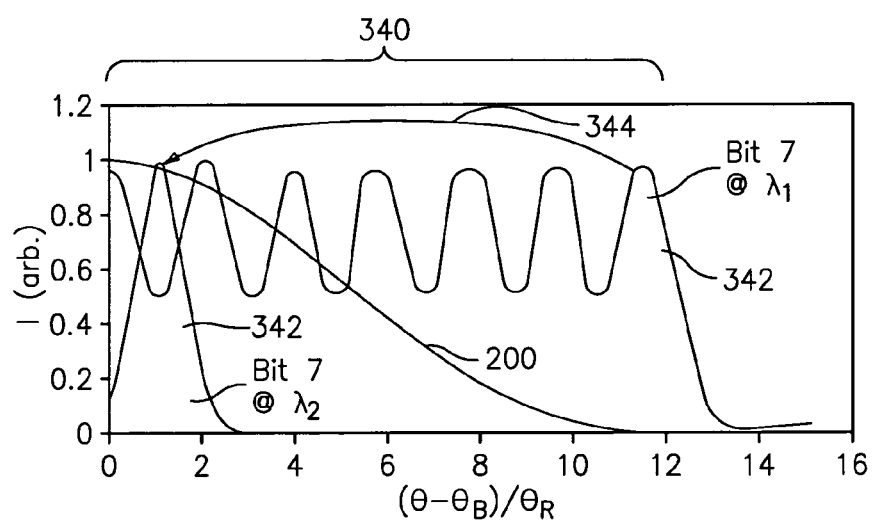
FIGS. 20–22 are a graphs of a plurality of bits and a Bragg envelope of an optical identification element, in accordance with the present invention.
Figure 21:
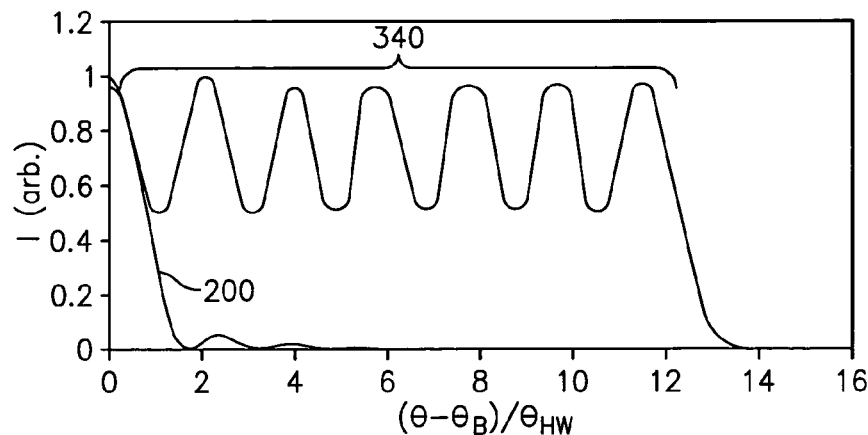

Referring to FIG. 20, is an example of bit readout with two different input wavelengths, e/g., λ1,λ2. The rightmost bit 342 falls outside the Bragg envelope 200 when λ1 is the source, but falls within the Bragg envelope 200 for λ2. Thus, the effective position of the bit 342 shifts based on input wavelength as indicated by a line 344.

Figure 22:
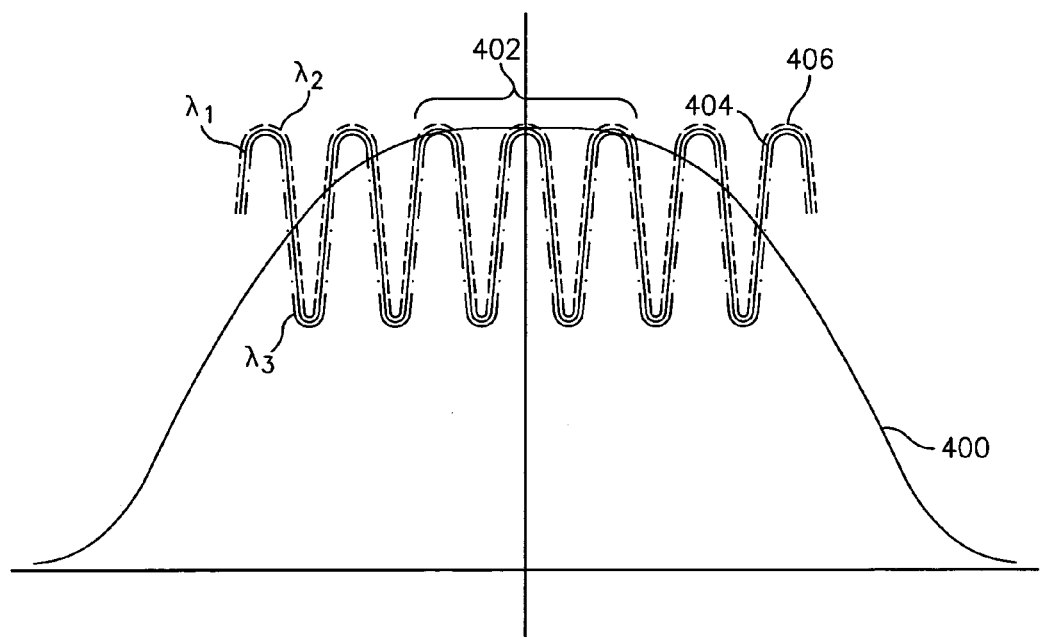

Referring to FIG. 22, it is also possible to combine the angular-based code detection with the wavelength-based code detection, both discussed hereinbefore. In this case, each readout wavelength is associated with a predetermined number of bits within the Bragg envelope. Bits (or grating pitches Λ) written for different wavelengths do not show up unless the correct wavelength is used. For example, the Bragg envelope 400 is set so that about 3 bits (or pitches Λ) 402 fit within the Bragg envelope 400 for a given input wavelength λ1, as indicated by a solid line 404, so that a second set of 3 bits (or pitches Λ) 402 fit within the Bragg envelope 400 for second input wavelength λ2, as indicated by a dashed line 406, and so that a third set of 3 bits (or pitches Λ) 402 fit within the Bragg envelope 400 for a third input wavelength λ3 as indicated by a dashed line 408. It should be understood that each of the sets of bits may not lie on top of each other in the Bragg envelope as shown in FIG. 22.

In view of the foregoing, the bits (or grating pitches Λ) can be read using one wavelength and many angles, many wavelengths and one angle, or many wavelengths and many angles.

Figure 23:
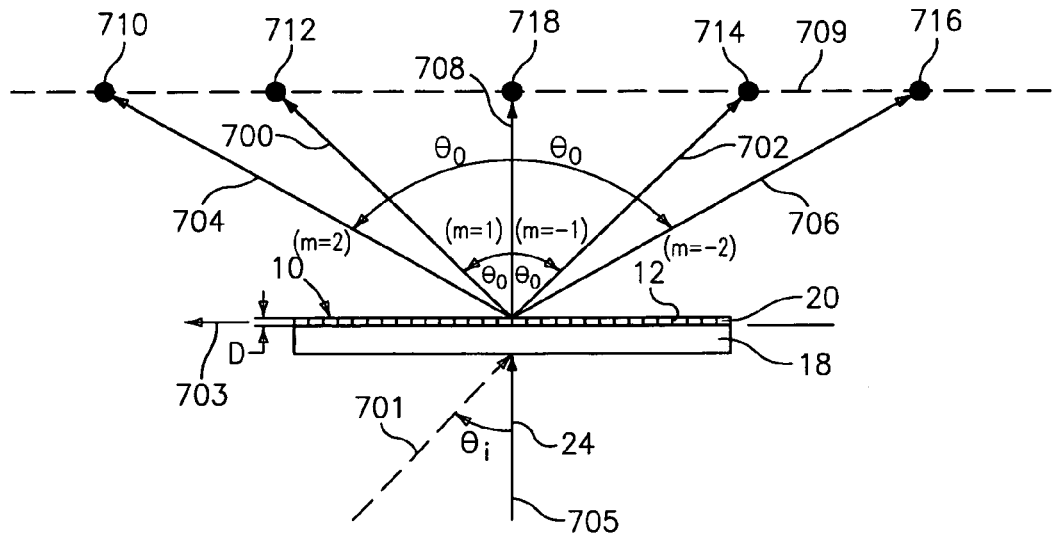
FIGS. 23–24 are side views of a thin grating for an optical identification element, in accordance with the present invention.

Referring to FIG. 23, the grating 12 may have a thickness or depth D which is comparable or smaller than the incident beam wavelength λ. This is known as a "thin" diffraction grating (or the full angle Bragg envelope is 180 degrees). In that case, the half-angle Bragg envelope θB is substantially 90 degrees; however, δn must be made large enough to provide sufficient reflection efficiency, per Eqs. 3 and 4. In particular, for a "thin" grating, $D*\delta n \approx \lambda/2$, which corresponds to a π phase shift between adjacent minimum and maximum refractive index values of the grating 12.

It should be understood that there is still the trade-off discussed hereinbefore with beam divergence angle $\theta_R$ and the incident beam width (or length L of the substrate), but the accessible angular space is theoretically now 90 degrees. Also, for maximum efficiency, the phase shift between adjacent minimum and maximum refractive index values of the grating 12 should approach a $\pi$ phase shift; however, other phase shifts may be used.

In this case, rather than having the input light 24 be incident at the conventional Bragg input angle $\theta i$, as discussed hereinbefore and indicated by a dashed line 701, the grating 12 is illuminated with the input light 24 oriented on a line 705 orthogonal to the longitudinal grating vector 703. The input beam 24 will split into two (or more) beams of equal amplitude, where the exit angle $\theta_o$ can be determined from Eq. 1 with the input angle $\theta_i=0$ (normal to the longitudinal axis of the grating 12).

In particular, from Eq. 1, for a given grating pitch $\Lambda 1$, the $+/-1^{st}$ order beams (m=+1 and m=−1) corresponds to output beams 700,702, respectively, and the $+/-2^{nd}$ order beams (m=+2 and m=−2) corresponds to output beams 704,706, respectively. The $0^{th}$ order (undiffracted) beam (m=0) corresponds to beam 708 and passes straight through the substrate. The output beams 700–708 project spectral spots or peaks 710–718, respectively, along a common plane, shown from the side by a line 709, which is parallel to the upper surface of the substrate 10.

For example, for a grating pitch $\Lambda=1.0$ um, and an input wavelength $\lambda=400$ nm, the exit angles $\theta_o$ are ~+/−23.6 degrees (for m=+/−1), and +/−53.1 degrees (from m=+/−2), from Eq. 1. It should be understood that for certain wavelengths, certain orders (e.g., m=+/−2) may be reflected back toward the input side or otherwise not detectable at the output side of the grating 12.

Alternatively, one can use only the $+/-1_{st}$ order (m=+/−1) output beams for the code, in which case there would be only 2 peaks to detect, 712, 714. Alternatively, one can also use any one or more pairs from any order output beam that is capable of being detected. Alternatively, instead of using a pair of output peaks for a given order, an individual peak may be used.

Figure 24:
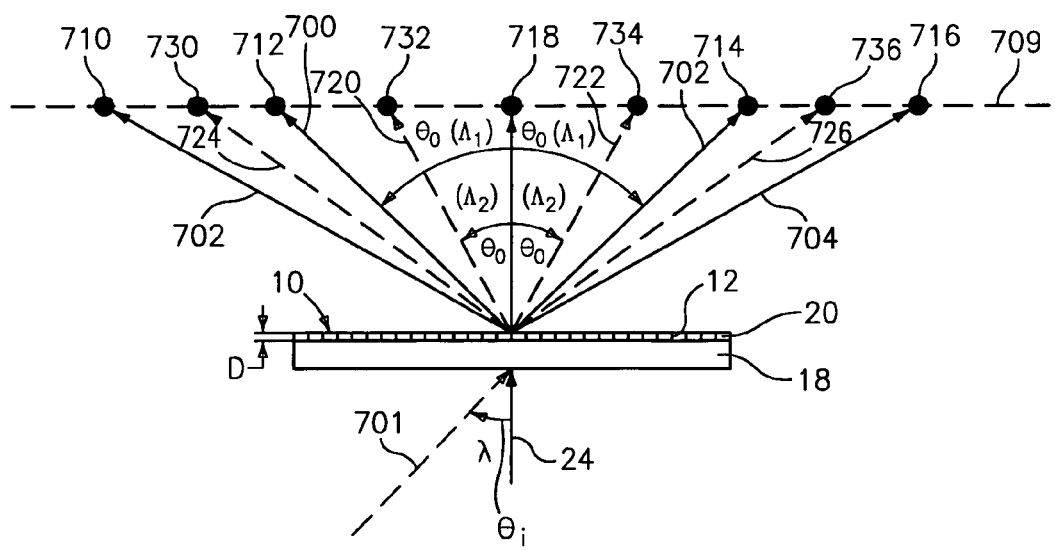

Referring to FIG. 24, if two pitches $\Lambda 1$, $\Lambda 2$ exist in the grating 12, two sets of peaks will exist. In particular, for a second grating pitch $\Lambda 2$, the $+/-1^{st}$ order beams (m=+1 and m=−1) corresponds to output beams 720,722, respectively, and. For the $+/-2^{nd}$ order beams (m=+2 and m=−2) corresponds to output beams 724,726, respectively. The $0^{th}$ order (un-diffracted) beam (m=0) corresponds to beam 718 and passes straight through the substrate. The output beams 720–726 corresponding to the second pitch $\Lambda 2$ project spectral spots or peaks 730–736, respectively, which are at a different location than the point 710–716, but along the same common plane, shown from the side by the line 709.

Thus, for a given pitch $\Lambda$ (or bit) in a grating, a set of spectral peaks will appear at a specific location in space. Thus, each different pitch corresponds to a different elevation or output angle which corresponds to a predetermined set of spectral peaks. Accordingly, the presence or absence of a particular peak or set of spectral peaks defines the code.

In general, if the angle of the grating 12 is not properly aligned with respect to the mechanical longitudinal axis of the substrate 10, the readout angles may no longer be symmetric, leading to possible difficulties in readout. With a thin grating, the angular sensitivity to the alignment of the longitudinal axis of the substrate 10 to the input angle $\theta i$ of incident radiation is reduced or eliminated. In particular, the input light can be oriented along substantially any angle $\theta i$ with respect to the grating 12 without causing output signal degradation, due the large Bragg angle envelope. Also, if the incident beam 24 is normal to the substrate 10, the grating 12 can be oriented at any rotational (or azimuthal) angle without causing output signal degradation. However, in each of these cases, changing the incident angle $\theta i$ will affect the output angle $\theta o$ of the reflected light in a predetermined predictable way, thereby allowing for accurate output code signal detection or compensation.

Figures 25, 26:
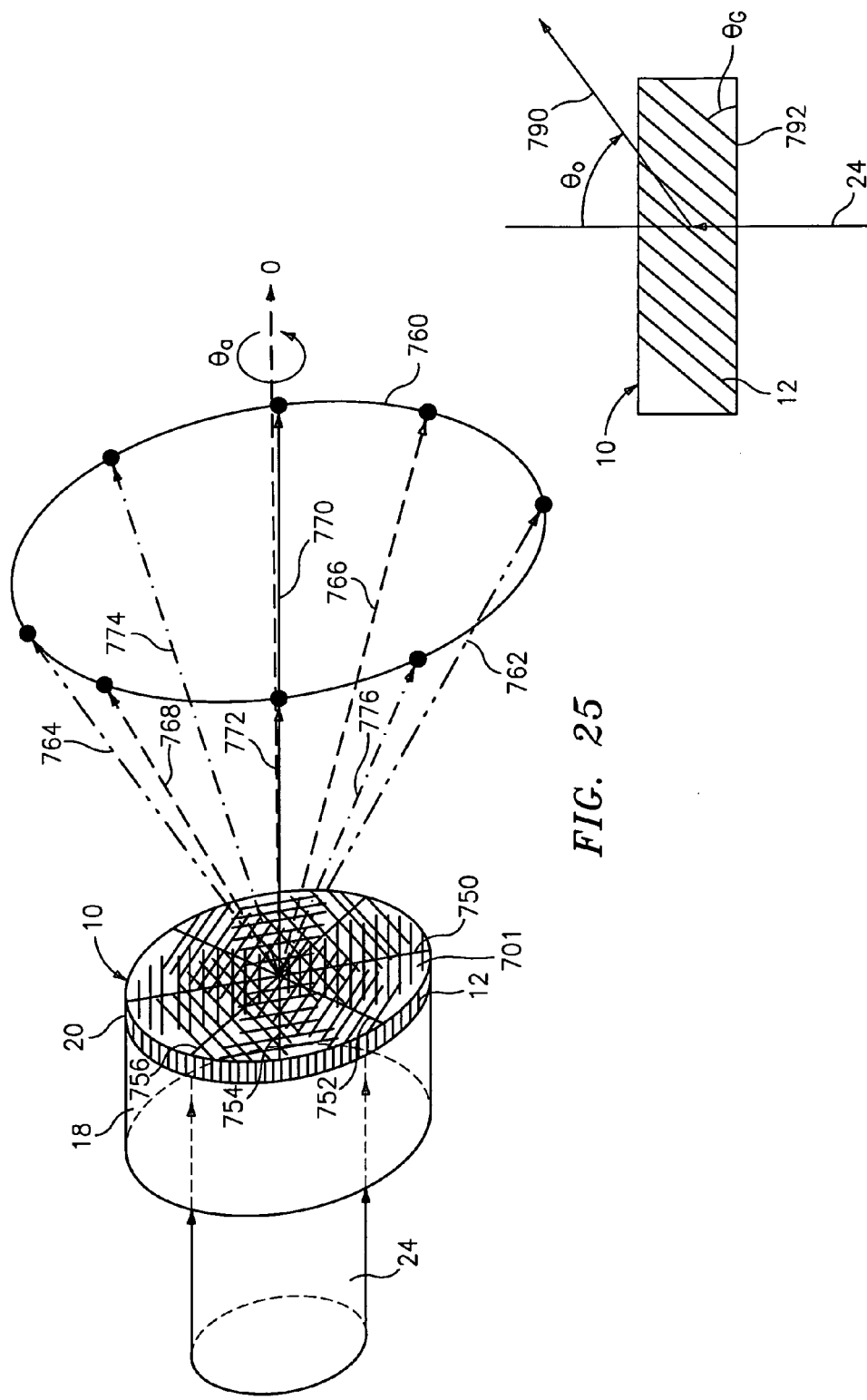
FIG. 25 is a perspective view azimuthal multiplexing of a thin grating for an optical identification element, in accordance with the present invention.
FIG. 26 is side view of a blazed grating for an optical identification element, in accordance with the present invention.

Referring to FIG. 25, for a thin grating, in addition to multiplexing in the elevation or output angle based on grating pitch $\Lambda$, the bits can also be multiplexed in an azimuthal (or rotational) angle $\theta a$ of the substrate. In particular, a plurality of gratings 750,752,754,756 each having the same pitch $\Lambda$ are disposed in a surface 701 of the substrate 10 and located in the plane of the substrate surface 701. The input light 24 is incident on all the gratings 750,752,754,756 simultaneously. Each of the gratings provides output beams oriented based on the grating orientation. For example, the grating 750 provides the output beams 764,762, the grating 752 provides the output beams 766,768, the grating 754 provides the output beams 770,772, and the grating 756 provides the output beams 774,776. Each of the output beams provides spectral peaks or spots (similar to that discussed hereinbefore), which are located in a plane 760 that is parallel to the substrate surface plane 701. In this case, a single grating pitch $\Lambda$ can produce many bits depending on the number of gratings that can be placed at different rotational (or azimuthal) angles on the surface of the substrate 10 and the number of output beam spectral peaks that can be spatially and optically resolved/detected. Each bit may be viewed as the presence or absence of a pair of peaks located at a predetermined location in space in the plane 760. Note that this example uses only the m=+/−$1^{st}$ order for each reflected output beam. Alternatively, the detection may also use the m=+/−$2^{nd}$ order. In that case, there would be two additional output beams and peaks (not shown) for each grating (as discussed hereinbefore) that may lie in the same plane as the plane 760 and may be on a concentric circle outside the circle 760.

In addition, the azimuthal multiplexing can be combined with the elevation (or output angle) multiplexing discussed hereinbefore to provide two levels of multiplexing. Accordingly, for a thin grating, the number of bits can be multiplexed based on the number of grating pitches $\Lambda$ and/or geometrically by the orientation of the grating pitches.

Furthermore, if the input light angle $\theta i$ is normal to the substrate 10, the edges of the substrate 10 no longer scatter light from the incident angle into the "code angular space", as discussed hereinbefore.

Also, in the thin grating geometry, a continuous broadband wavelength source may be used as the optical source if desired.

Referring to FIG. 26, instead of or in addition to the pitches $\Lambda$ in the grating 12 being oriented normal to the longitudinal axis, the pitches may be created at a angle $\theta g$. In that case, when the input light 24 is incident normal to the surface 792, will produce a reflected output beam 790 having an angle $\theta o$ determined by Eq. 1 as adjusted for the blaze angle $\theta g$. This can provide another level of multiplexing bits in the code.

Figure 27:
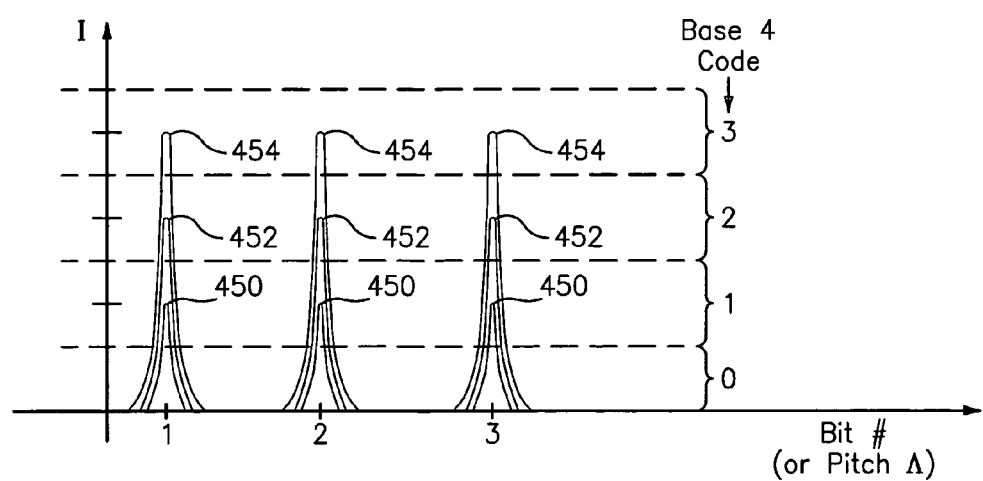
FIG. 27 is a graph of a plurality of states for each bit in a code for an optical identification element, in accordance with the present invention.

Referring to FIG. 27, instead of using an optical binary (0–1) code, an additional level of multiplexing may be provided by having the optical code use other numerical bases, if intensity levels of each bit are used to indicate code information. This could be achieved by having a corresponding magnitude (or strength) of the refractive index change (δn) for each grating pitch Λ. In FIG. 27, four intensity ranges are shown for each bit number or pitch Λ, providing for a Base-4 code (where each bit corresponds to 0,1,2, or 3). The lowest intensity level, corresponding to a 0, would exist when this pitch Λ is not present in the grating. The next intensity level 450 would occur when a first low level δn1 exists in the grating that provides an output signal within the intensity range corresponding to a 1. The next intensity level 452 would occur when a second higher level δn2 exists in the grating 12 that provides an output signal within the intensity range corresponding to a 2. The next intensity level 454, would occur when a third higher level δn3 exists in the grating 12 that provides an output signal within the intensity range corresponding to a 3. Accordingly, an additional level of multiplexing may be provided.

Referring to FIGS. 33–37, alternatively, two or more substrates 10,250, each having at least one grating therein, may be attached together to form the element 8, e.g., by an adhesive, fusing or other attachment techniques. In that case, the gratings 12,252 may have the same or different codes.

Referring to FIGS. 36,38, alternatively, the substrate 10 may have more than one region 80, 82, 84, 86, 88, 90 having codes code 1, code 2, code 3 . . . code N. For example, there may be two gratings side-by-side, or spaced end-to-end, such as that shown in FIGS. 33,38, respectively.

Referring to FIG. 37, the length L of the element 8 may be shorter than its diameter D, such as a plug or puck or wafer or disc.

Figure 39:
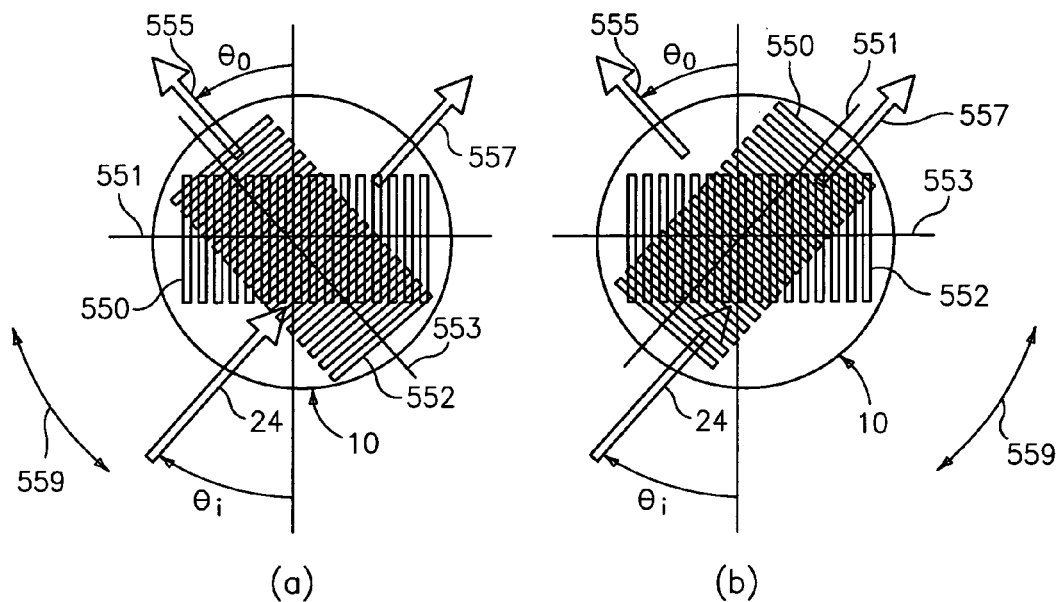
FIG. 39 is a view an optical identification element having a plurality of grating located rotationally around an optical identification element, in accordance with the present invention.

Referring to FIG. 39, illustrations (a) and (b), to facilitate proper alignment of the grating axis with the angle θi of the input beam 24, the substrate 10 may have a plurality of the gratings 12 having the same codes written therein at numerous different angular or rotational positions of the substrate 10. In particular, in illustration a), there are two gratings 550, 552, having axial grating axes 551, 553, respectively. The gratings 550,552 have a common central (or pivot or rotational) point where the two axes 551,553 intersect. The angle θi of the incident light 24 is aligned properly with the grating 550 and is not aligned with the grating 552, such that output light 555 is reflected off the grating 550 and light 557 passes through the grating 550 as discussed herein. In illustration (b), the angle θi of incident light 24 is aligned properly with the grating 552 and not aligned with the grating 550 such that output light 555 is reflected off the grating 552 and light 557 passes through the grating 552 as discussed herein. When multiple gratings are located in this rotational orientation, the bead may be rotated as indicated by a line 559 and there may be many angular positions that will provide correct (or optimal) incident input angles θi to the grating. While this example shows a circular cross-section, this technique may be used with any shape cross-section.

Referring to FIG. 58, the substrate 10 may have an outer coating 799, such as a polymer or other material that may be dissimilar to the material of the substrate 10, provided that the coating 799 on at least a portion of the substrate, allows sufficient light to pass through the substrate for adequate optical detection of the code. The coating 799 may be on any one or more sides of the substrate 10. Also, the coating 799 may be a solid, liquid, gas or powder, a chemical polymer, metal, or other material, or they may be coated with a material that allows the beads to float, sink, glow, reflect light, repel or absorb a fluid (liquid and/or gas) or material, align, have a predetermined electrical or magnetic polarization, moment or field, or have other properties.

Also, the substrate 10 may be made of a material that is less dense than certain fluid (liquids and/or gas) solutions, thereby allowing the elements 8 to float or be buoyant or partially buoyant. Also, the substrate may be made of a porous material, such as controlled pore glass (CPG) or other porous materials, which may also reduce the density of the element 8 and may make the element 8 buoyant or partially-buoyant in certain fluids.

Alternatively, the substrate 10 may be made of a material that dissolves in the presence of certain chemicals or over time.

Figure 40:
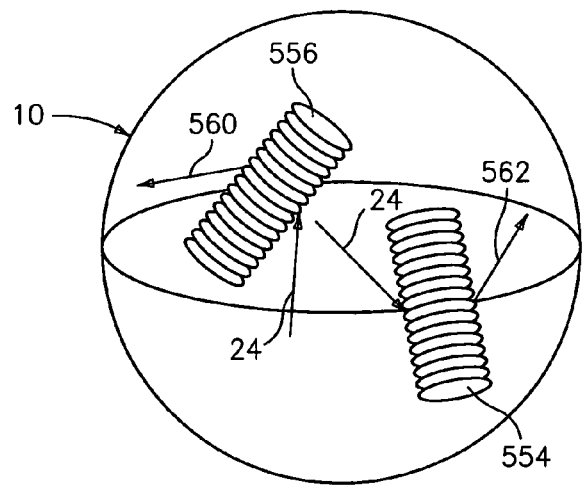
FIG. 40 is a view an optical identification element having a plurality of gratings disposed on a spherical optical identification element, in accordance with the present invention.

Referring to FIG. 40, the substrate may have a spherical geometry. In that case, the substrate 10 may have multiple gratings 554, 556 located in different three-dimensional planes. In that case, input light 24 is incident on the gratings 554,556 and the gratings 554,556 provide reflected output light 560,562 as discussed hereinbefore.

Figure 41:
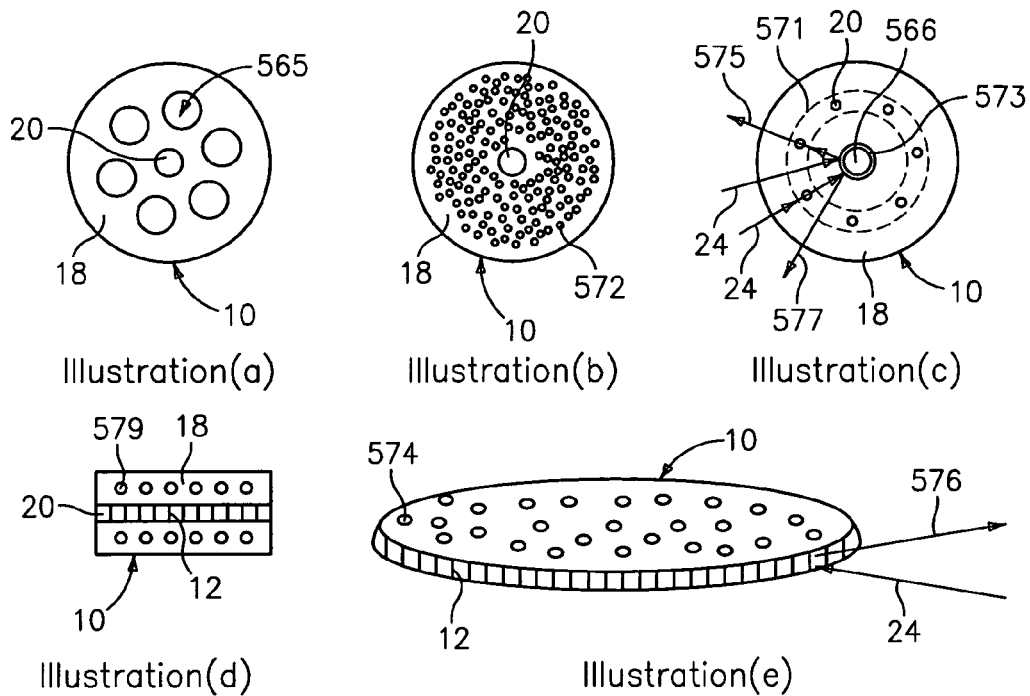
FIG. 41 illustrations (a)–(e) show various geometries of an optical identification element that may have holes therein, in accordance with the present invention.

Referring to FIG. 41 illustrations (a), (b), (c), (d), and (e) the substrate 10 may have one or more holes located within the substrate 10. In illustration (a), holes 560 may be located at various points along all or a portion of the length of the substrate 10. The holes need not pass all the way through the substrate 10. Any number, size and spacing for the holes 560 may be used if desired. In illustration (b), holes 572 may be located very close together to form a honeycomb-like area of all or a portion of the cross-section. In illustration (c), one (or more) inner hole 566 may be located in the center of the substrate 10 or anywhere inside of where the grating region (s) 20 are located. The inner hole 566 (or any holes described herein) may be coated with a reflective coating 573 to reflect light to facilitate reading of one or more of the gratings 12 and/or to reflect light diffracted off one or more of the gratings 12. The incident light 24 may reflect off the grating 12 in the region 20 and then reflect off the surface 573 to provide output light 577. Alternatively, the incident light 24 may reflect off the surface 573, then reflect off the grating 12 and provide the output light 575. In that case the grating region 20 may run axially or circumferentially 571 around the substrate 10. In illustration (d), the holes 579 may be located circumferentially around the grating region 20 or transversely across the substrate 10. In illustration (e), the grating 12 may be located circumferentially (and running up-down) around the outside of the substrate 10, and there may be holes 574 inside the substrate 10. Alternatively, the grating 12 may be located circumferentially (and running circumferentially) around the outside of the substrate 10. In that case, the incident light 24 reflects of the grating 12 to provide the output light 576 as shown.

Also, any of the holes described herein for the element 8 or substrate 10 may be filled with a solid, liquid, gas or powder, a chemical polymer, metal, or other material, or they may be coated with a material that allows the beads to float, sink, glow, reflect light, repel or absorb a fluid or material, align, have a predetermined electrical or magnetic polarization, moment or field, or have other properties, or may be similar to or the same as the coating 799 (FIG. 58) or the reflective coating 514 of FIG. 30, discussed hereinbefore.

Figure 42:
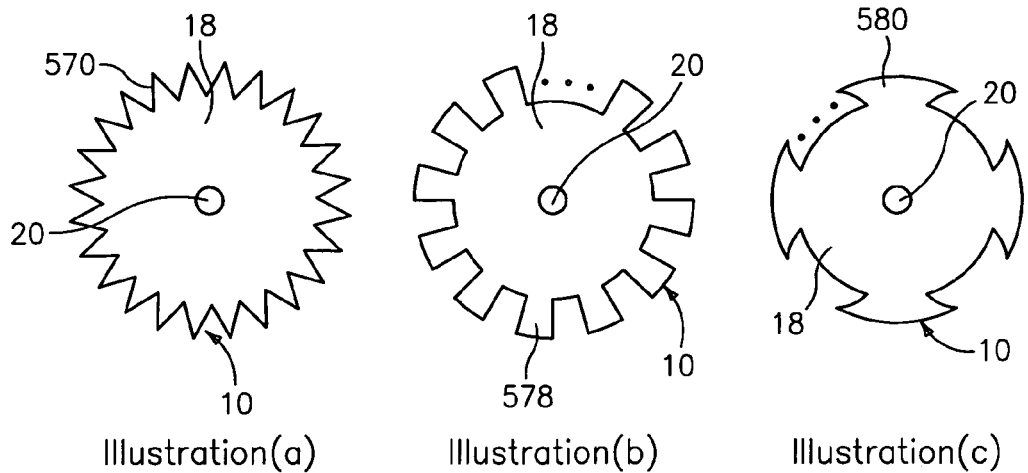
FIG. 42 illustrations (a)–(c) show various geometries of an optical identification element that may have teeth therein, in accordance with the present invention.

Referring to FIG. 42, illustrations (a), (b), and (c), the substrate 10 may have one or more protruding portions or teeth 570, 578,580 extending radially and/or circumferentially from the substrate 10. Alternatively, the teeth 570, 578,580 may have any other desired shape.

Figure 43:
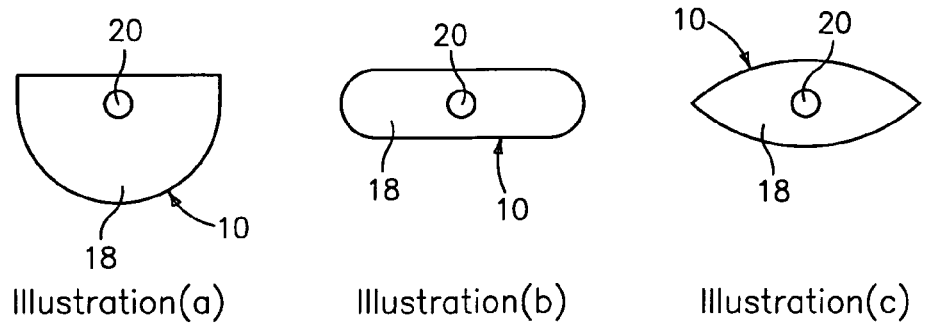
FIG. 43 illustrations (a)–(c) show various geometries of an optical identification element, in accordance with the present invention.

Referring to FIG. 43, illustrations (a), (b), (c) a D-shaped substrate, a flat-sided substrate and an eye-shaped (or clamshell or teardrop shaped) substrate 10, respectively, are shown. Also, the grating region 20 may have end cross-sectional shapes other than circular and may have side cross-sectional shapes other than rectangular, such as any of the geometries described herein for the substrate 10. For example, the grating region 20 may have a oval cross-sectional shape, which may be oriented in a desired direction, consistent with the teachings herein. Any other geometries for the substrate 10 or the grating region 20 may be used if desired, as described herein. In the case of an oval shaped grating region 20 may provide high diffraction efficiency, when light is incident on the long side of the oval.

Referring to FIG. 28, the elements 8 may be placed in a tray or plate 207 with grooves 205 to allow the elements 8 to be aligned in a predetermined direction for illumination and reading/detection as discussed herein. Alternatively, the grooves 205 may have holes 210 that provide suction to keep the elements 8 in position. The groove plate 207 may be illuminated from the top, side or the bottom of the plate.

Referring to FIG. 29, instead of a flat plate, the beads may be aligned in a tube 502 that has a diameter that is only slightly larger than the substrate 10, e.g., about 1–50 microns, and that is substantially transparent to the incident light 24. In that case, the incident light 24 may pass through the tube 502 as indicated by the light 500 or be reflected back due to a reflective coating on the tube 500 or the substrate as shown by return light 504. Other techniques can be used for alignment if desired.

Referring to FIG. 30, at least a portion of a side of the substrate 10 may be coated with a reflective coating 514 to allow incident light 510 to be reflected back to the same side from which the incident light came, as indicated by reflected light 512.

Figure 31:
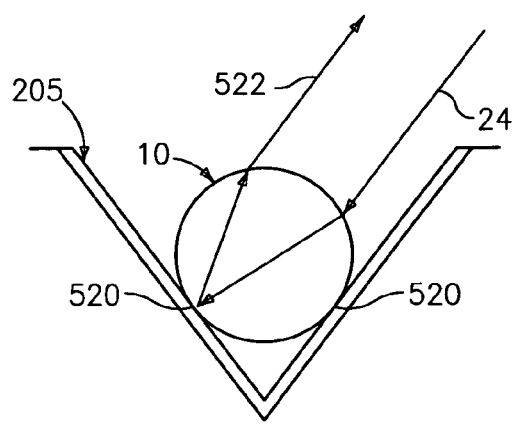
FIGS. 31 and 32 are side views or a groove plate having a reflective coating thereon, in accordance with the present invention.
Figure 32:
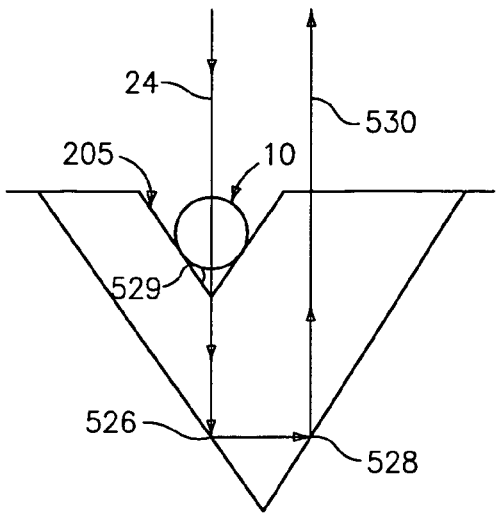

Referring to FIGS. 28 and 31, alternatively, the surfaces inside the V-grooves 205 may be made of or coated with a reflective material that reflects the incident light. A light beam is incident onto the substrate and diffracted by the grating 12. In particular, the diffracted beam may be reflected by a surface 520 of the V-groove 205 and read as an output beam 522 from the same direction as the incident beam 24. Alternatively, referring to FIGS. 28 and 32, the incident light beam 24 may be diffracted by the grating 12 and pass through the upper surface 529 of the v-groove and reflected off two surfaces 526, 528 which are made or coated with a reflective coating to redirect the output beam upward as a output light beam 530 which may be detected as discussed hereinbefore.

Referring to FIG. 57, illustrations (a) and (b), alternatively, the substrate 10 can be electrically and/or magnetically polarized, by a dopant or coating, which may be used to ease handling and/or alignment or orientation of the substrate 10 and/or the grating 12, or used for other purposes. Alternatively, the bead may be coated with conductive material, e.g., metal coating on the inside of a holy substrate, or metallic dopant inside the substrate. In these cases, such materials can cause the substrate 10 to align in an electric or magnetic field. Alternatively, the substrate can be doped with an element or compound that fluoresces or glows under appropriate illumination, e.g., a rare earth dopant, such as Erbium, or other rare earth dopant or fluorescent or luminescent molecule. In that case, such fluorescence or luminescence may aid in locating and/or aligning substrates.

Figure 45:
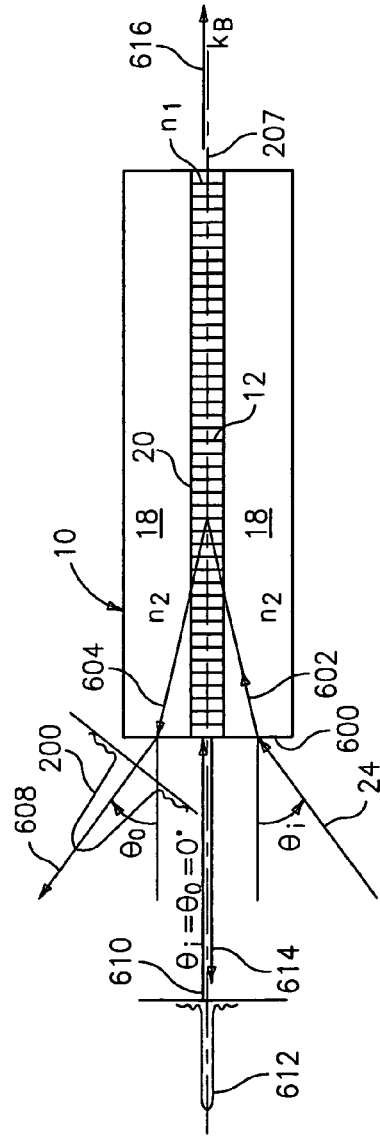
FIG. 45 is a side view of an optical identification element where light is incident on an end face, in accordance with the present invention.

Referring to FIG. 45, the input light 24 may be incident on the substrate 10 on an end face 600 of the substrate 10. In that case, the input light 24 will be incident on the grating 12 having a more significant component of the light (as compared to side illumination discussed hereinbefore) along the longitudinal grating axis 207 of the grating (along the grating vector $k_B$), as shown by a line 602. The light 602 reflects off the grating 12 as indicated by a line 604 and exits the substrate as output light 608. Accordingly, it should be understood by one skilled in the art that the diffraction equations discussed hereinbefore regarding output diffraction angle θo also apply in this case except that the reference axis would now be the grating axis 207. Thus, in this case, the input and output light angles θi,θo, would be measured from the grating axis 207 and length Lg of the grating 12 would become the thickness or depth D of the grating 12. As a result, for a grating 12 that is 400 microns long, this would result in the Bragg envelope 200 being narrow. It should be understood that because the values of n1 and n2 are close to the same value, the slight angle changes of the light between the regions 18,20 are not shown herein.

In the case where incident light 610 is incident along the same direction as the grating vector 207, i.e., θi=0 degrees, the light sees the length Lg of the grating 12 and the grating provides a reflected output light angle θo=0 degrees, and the Bragg envelope 612 becomes extremely narrow as the narrowing effect discussed above reaches a limit. In that case, the relationship between a given pitch Λ in the grating 12 and the wavelength of reflection λ is governed by a known "Bragg grating" relation:

$$\lambda = 2\, n_{eff} \Lambda \qquad \text{Eq. 12}$$

where $n_{eff}$ is the effective index of refraction of the substrate, λ is the input (and output wavelength) and Λ is the pitch. This relation, as is known, may be derived from Eq. 1 where θi=θo=90 degrees.

In that case, the code information is readable only in the spectral wavelength of the reflected beam, similar to that discussed hereinbefore for wavelength based code reading with FIG. 19. Accordingly the input signal in this case may be a scanned wavelength source or a broadband wavelength source. In addition, as discussed hereinbefore with FIG. 19, the code information may be obtained in reflection from the reflected beam 614 or in transmission by the transmitted beam 616 that passes through the grating 12.

Figure 46:
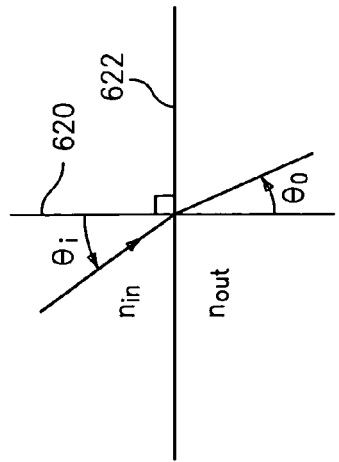
FIG. 46 is an illustration of input light and output light passing through two mediums, in accordance with the present invention.

Referring to FIG. 46, it should be understood that for shapes of the substrate 10 or element 8 other than a cylinder, the effect of various different shapes on the propagation of input light through the element 8, substrate 10, and/or grating 12, and the associated reflection angles, can be determined using known optical physics including Snell's Law, shown below:

$$n_{in} \sin\theta_{in} = n_{out} \sin\theta_{out} \qquad \text{Eq. 13}$$

where $n_{in}$ is the refractive index of the first (input) medium, and $n_{out}$ is the refractive index of the second (output) medium, and θin and θout are measured from a line 620 normal to an incident surface 622.

Figure 47:
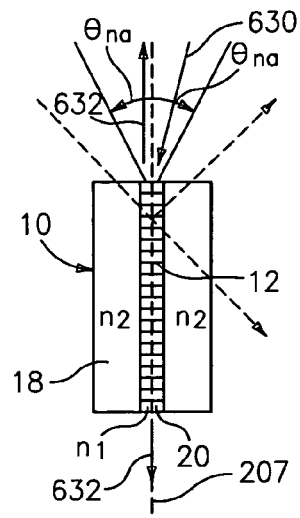
FIGS. 47–48 are a side view of an optical identification element where light is incident on an end face, in accordance with the present invention.

Referring to FIG. 47, if the value of n1 in the grating region 20 is greater than the value of n2 in the non-grating region 18, the grating region 20 of the substrate 10 will act as a known optical waveguide for certain wavelengths. In that case, the grating region 20 acts as a "core" along which light is guided and the outer region 18 acts as a "cladding" which helps confine or guide the light. Also, such a waveguide will have a known "numerical aperture" (θna) that will allow light 630 that is within the aperture θna to be directed or guided along the grating axis 207 and reflected axially off the grating 12 and returned and guided along the waveguide. In that case, the grating 12 will reflect light having the appropriate wavelengths equal to the pitches Λ present in the grating 12 back along the region 20 (or core) of the waveguide, and pass the remaining wavelengths of light as the light 632. Thus, having the grating region 20 act as an optical waveguide for wavelengths reflected by the grating 12 allows incident light that is not aligned exactly with the grating axis 207 to be guided along and aligned with the grating 12 axis 207 for optimal grating reflection.

If an optical waveguide is used any standard waveguide may be used, e.g., a standard telecommunication single mode optical fiber (125 micron diameter or 80 micron diameter fiber with about a 8–10 micron diameter), or a larger diameter waveguide (greater than 0.5 mm diameter), such as is describe in U.S. patent application, Ser. No. 09/455,868, filed Dec. 6, 1999, entitled "Large Diameter Waveguide, Grating". Further, any type of optical waveguide may be used for the optical substrate 10, such as, a multi-mode, birefringent, polarization maintaining, polarizing, multi-core, multi-cladding, or microstructured optical waveguide, or a flat or planar waveguide (where the waveguide is rectangular shaped), or other waveguides.

Figure 48:
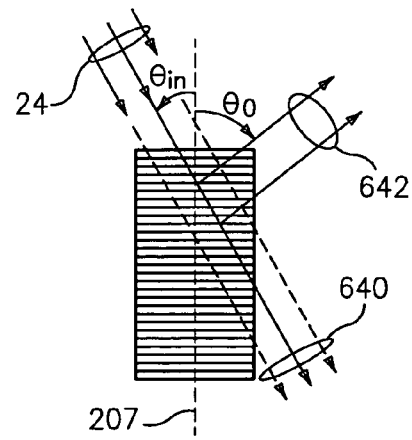

Referring to FIG. 48, if the grating 12 extends across the entire dimension D of the substrate, the substrate 10 does not behave as a waveguide for the incident or reflected light and the incident light 24 will be diffracted (or reflected) as indicated by lines 642, and the codes detected as discussed hereinbefore for the end-incidence condition discussed hereinbefore with FIG. 45, and the remaining light 640 passes straight through.

Figure 49:
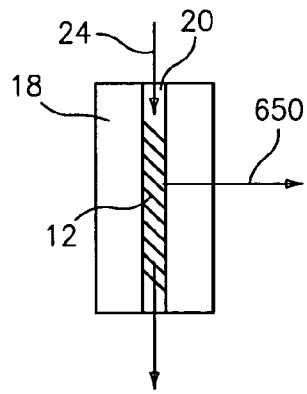
FIGS. 49–51 are side views of an optical identification element having a blazed grating, in accordance with the present invention.

Referring to FIG. 49, for the end illumination condition, if a blazed or angled grating is used, as discussed hereinbefore, the input light 24 is coupled out of the substrate 10 at a known angle as shown by a line 650.

Figure 50:
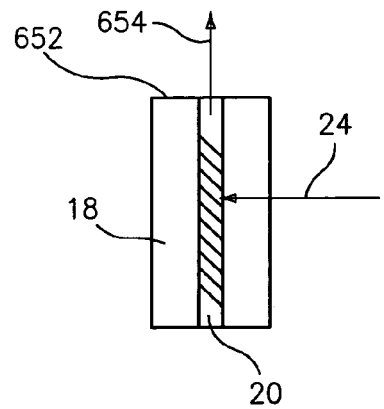

Referring to FIG. 50, alternatively, the input light 24 may be incident from the side and, if the grating 12 has the appropriate blaze angle, the reflected light will exit from the end face 652 as indicated by a line 654.

Figure 51:
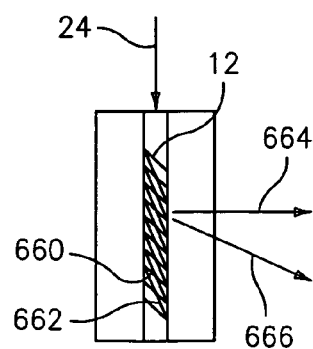

Referring to FIG. 51, the grating 12 may have a plurality of different pitch angles 660,662, which reflect the input light 24 to different output angles as indicated by lines 664, 666. This provides another level of multiplexing (spatially) additional codes, if desired.

Figure 52:
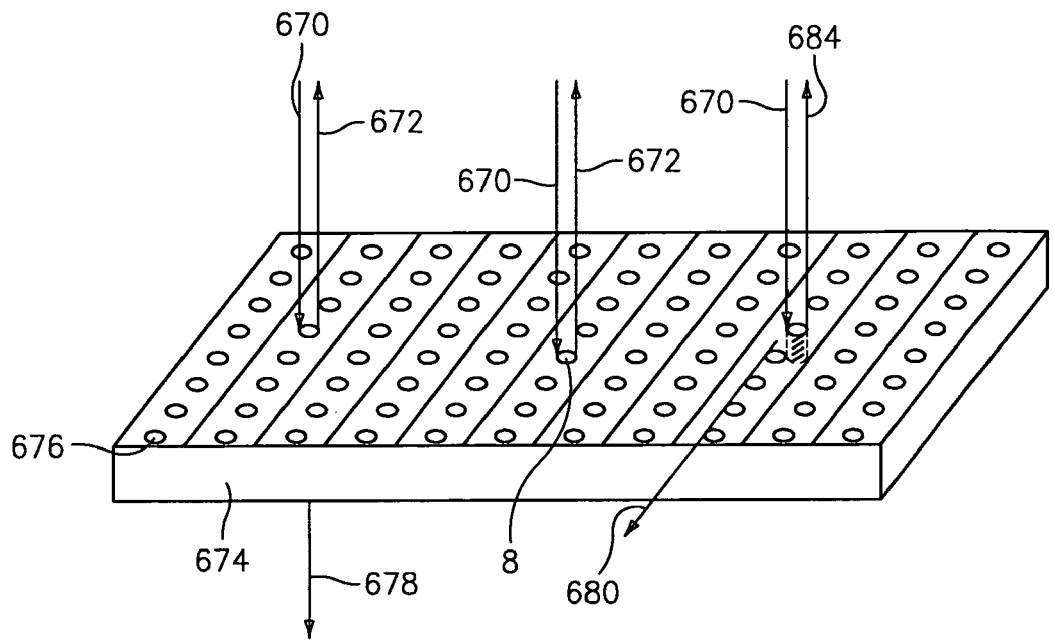
FIG. 52 is a perspective view of a plate with holes for use with an optical identification element, in accordance with the present invention.

Referring to FIG. 52, if the light 240 is incident along the grating axis 207 (FIGS. 11 & 45), alignment may be achieved by using a plate 674 having holes 676 slightly larger than the elements 8. The incident light 670 is reflected off the grating and exits through the end as a light 672 and the remaining light passes through the grating and the plate 674 as a line 678. Alternatively, if a blazed grating is used, as discussed hereinbefore with FIG. 51, incident light 670 may be reflected out the side of the plate (or any other desired angle), as indicated by a line 680. Alternatively, input light may be incident from the side of the plate 674 and reflected out the top of the plate 674 as indicated by a line 684. The light 672 may be a plurality of separate light beams or a single light beam that illuminates the entire tray 674 if desired.

Figure 53:
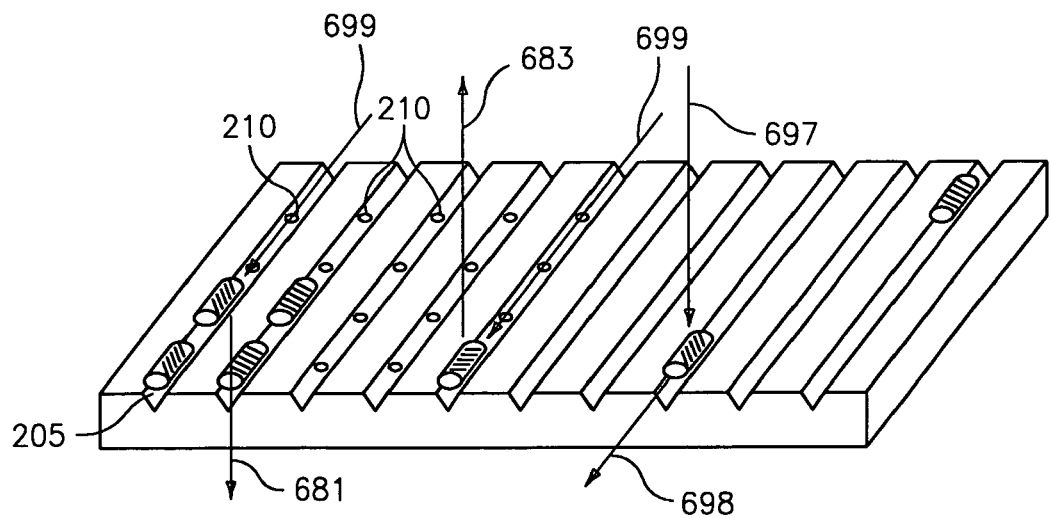
FIG. 53 is a perspective view of a grooved plate for use with an optical identification element, in accordance with the present invention.

Referring to FIG. 53, the v-groove plate discussed hereinbefore with FIG. 28 may be used for the end illumination/readout condition. As shown, the beads 8 are arranged in V-grooves 205, which may also take the form of square grooves generally indicated as dashed lines 211. In that case, the grating 12 may have a blaze angle such that light incident 699 along the axial grating axis will be reflected upward as reflected light 683, downward as reflected light 681, or at a predetermined angle for code detection. Similarly, the input light 697 may be incident on the grating in a downward, upward, or at a predetermined angle and the grating 12 may reflect light 698 along the axial grating axis for code detection.

Figure 54:
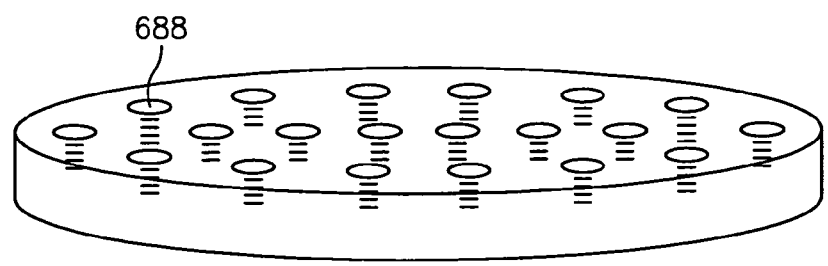
FIG. 54 is a perspective view of a disc shaped optical identification element, in accordance with the present invention.
Figure 55:
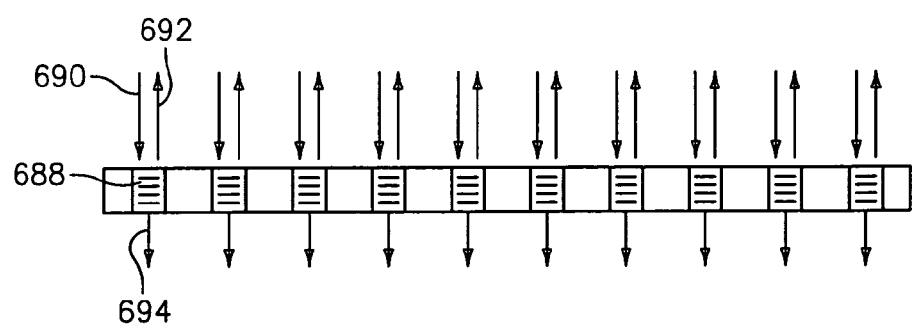
FIG. 55 is a side view of FIG. 54, in accordance with the present invention.

Referring to FIGS. 54 and 55, the substrate 10 may have a plurality of gratings 688 disposed therein oriented for end illumination and/or readout, where input light is shown as a line 690 and output light is shown as a line 692 for reading in reflection and/or a line 694 for reading in transmission.

The grating 12 may be impressed in the substrate 10 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming A periodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat. No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the substrate material, the grating 12 may be partially or totally created by etching or otherwise altering the outer surface geometry of the substrate to create a corrugated or varying surface geometry of the substrate, such as is described in U.S. Pat. No. 3,891,302, entitled "Method of Filtering Modes in Optical Waveguides", to Dabby et al, which is incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

Unless otherwise specifically stated herein, the term "microbead" is used herein as a label and does not restrict any embodiment or application of the present invention to certain dimensions, materials and/or geometries.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An encoded particle, comprising:
   a particle substrate;
   at least a portion of said substrate being made of a substantially single material and having at least one diffraction grating embedded therein, said grating having a resultant refractive index variation within said single material at a grating location, said refractive index variation comprising a plurality of refractive index pitches superimposed at said grating location; and said grating providing an output optical signal indicative of a code when illuminated by an incident light signal propagating from outside said substrate, said output optical signal being a result of passive, non-resonant scattering from said grating when illuminated by said incident light signal.

2. The apparatus of claim 1, wherein said substrate is made of a material selected from the group: glass, silica, plastic, rubber, and polymer.

3. The apparatus of claim 1, wherein said code comprises a plurality of digital bits.

4. The apparatus of claim 1, wherein said code comprises at least a predetermined number of bits, said number being: 3, 5, 7, 9, 10, 12, 14, 16, 18, 20, 24, 28, 30, 40, 50, or 100.

5. The apparatus of claim 1, wherein said code comprises a plurality of bits, each bit having a plurality of states.

6. The apparatus of claim 1, wherein said code comprises a plurality of bits, each bit having a corresponding spatial location and each bit in said code having a value related to the intensity of said output optical signal at the spatial location of each bit.

7. The apparatus of claim 6, wherein the value of each bit corresponds to the magnitude of refractive index variation of a corresponding refractive index pitch in said grating.

8. The apparatus of claim 1, wherein said code comprises a plurality of digital bits, each bit having a corresponding spatial location and each bit in said code having a binary value related to the intensity of said output optical signal at the spatial location of each bit.

9. The apparatus of claim 8, wherein the value of each bit corresponds to the presence or absence of a corresponding refractive index pitch in said grating.

10. The apparatus of claim 1, wherein said incident light signal comprises a substantially single wavelength.

11. The apparatus of claim 1, wherein said incident light signal comprises a plurality of wavelengths or a single wavelength scanned over a predetermined wavelength range.

12. The apparatus of claim 11, wherein said code comprises a plurality of bits, and each bit in said code having a value related to the intensity of said output optical signal at a wavelength corresponding to each bit.

13. The apparatus of claim 12, wherein the value of each bit corresponds to the magnitude of refractive index variation of a corresponding refractive index pitch in said grating.

14. The apparatus of claim 11, wherein said code comprises a plurality of digital bits, and each bit in said code having a binary value related to the intensity of said output optical signal at the wavelength corresponding to each bit.

15. The apparatus of claim 14, wherein the value of each bit corresponds to the presence or absence of a corresponding refractive index pitch in said grating.

16. The apparatus of claim 1, wherein said substrate has a length that is less than a predetermined value, said value being about 30, 65, 80, 125, 250, 500, 750 or 1000 microns.

17. The apparatus of claim 1, wherein said substrate has a diameter that is less than a predetermined value, said value being about 30, 65, 80, 125, 250, 500, 750 or 1000 microns.

18. The apparatus of claim 1, wherein said substrate has a reflective coating disposed thereon.

19. The apparatus of claim 1, wherein said substrate has a coating disposed on at least a portion of said substrate, at least a portion of said coating being made of a material that allows sufficient amount of said incident light signal to pass through said material to allow detection of said code.

20. The apparatus of claim 1, wherein said substrate has a coating material disposed on at least a portion of said substrate, said coating comprising a polymer.

21. The apparatus of claim 1, wherein said substrate has a magnetic or electric charge polarization.

22. The apparatus of claim 1, wherein said substrate has geometry having holes therein or protruding sections therein.

23. The apparatus of claim 1, wherein at least a portion of said substrate has an end cross sectional geometry selected from the group: circular, square, rectangular, elliptical, clam-shell, D-shaped, and polygon.

24. The apparatus of claim 1, wherein at least a portion of said substrate has a side view geometry selected from the group: circular, square, rectangular, elliptical, clam-shell, D-shaped, and polygon.

25. The apparatus of claim 1, wherein at least a portion of said substrate has a 3-D shape selected from the group: a cylinder, a sphere, a cube, and a pyramid.

26. The apparatus of claim 1, wherein said substrate has a grating region where said grating is located and a non-grating region where said grating is not located; and wherein said substrate has a plurality of grating regions.

27. The apparatus of claim 1, wherein said substrate has a grating region where said grating is located and a non-grating region where said grating is not located; and wherein said grating region has a refractive index that is greater than that of said non-grating region.

28. The apparatus of claim 1, wherein said substrate has a grating region where said grating is located and a non-grating region where said grating is not located; and wherein said grating region has a refractive index that is not greater than that of said non-grating region.

29. The apparatus of claim 1, wherein said incident light signal is incident on said substrate along a longitudinal grating axis of said grating.

30. The apparatus of claim 1, wherein said incident light signal is incident on said substrate at an angle to a longitudinal grating axis of said grating.

31. The apparatus of claim 1, wherein said grating is a thin grating or a blazed grating.

32. The apparatus of claim 1, wherein said substrate comprises a plurality of said gratings.

33. The apparatus of claim 1, wherein said substrate comprises a plurality of said gratings each at different locations within said substrate.

34. The apparatus of claim 1, wherein said incident light signal comprises laser light.

35. The apparatus of claim 1, wherein said substrate is photosensitive at least at said grating location.

36. A method of reading an encoded particle, comprising:
obtaining a substrate, at least a portion of said substrate being made of a substantially single material and having at least one diffraction grating embedded therein, said grating having a resultant refractive index variation within said single material at a grating location, said refractive index variation comprising a plurality of refractive index pitches superimposed at said grating location;

illuminating said substrate with an incident light signal propagating from outside said substrate, said substrate providing an output optical signal indicative of a code, said output optical signal being a result of passive, non-resonant scattering from said grating when illuminated by said incident light signal; and reading said output optical signal and detecting said code therefrom.

37. The method of claim 36, wherein said substrate is made of a material selected from the group: glass, silica, plastic, rubber, and polymer.

38. The method of claim 36, wherein said code comprises a plurality of digital bits.

39. The method of claim 36, wherein said code comprises at least a predetermined number of bits, said number being: 3, 5, 7, 9, 10, 12, 14, 16, 18, 20, 24, 28, 30, 40, 50, or 100.

40. The method of claim 36, wherein said code comprises a plurality of bits, each bit having a plurality of states.

41. The method of claim 36, wherein said code comprises a plurality of bits, each bit having a corresponding spatial location and each bit in said code having a value related to the intensity of said output optical signal at the spatial location of each bit.

42. The method of claim 41, wherein the value of each bit corresponds to the magnitude of refractive index variation of a corresponding refractive index pitch in said grating.

43. The method of claim 36, wherein said code comprises a plurality of digital bits, each bit having a corresponding spatial location and each bit in said code having a binary value related to the intensity of said output optical signal at the spatial location of each bit.

44. The method of claim 43, wherein the value of each bit corresponds to the presence or absence of a corresponding refractive index pitch in said grating.

45. The method of claim 36, wherein said incident light signal comprises a substantially single wavelength.

46. The method of claim 36, wherein said incident light signal comprises a plurality of wavelengths or a single wavelength scanned over a predetermined wavelength range.

47. The method of claim 46, wherein said code comprises a plurality of bits, and each bit in said code having a value related to the intensity of said output optical signal at a wavelength corresponding to each bit.

48. The method of claim 47, wherein the value of each bit corresponds to the magnitude of refractive index variation of a corresponding refractive index pitch in said grating.

49. The method of claim 46, wherein said code comprises a plurality of digital bits, and each bit in said code having a binary value related to the intensity of said output optical signal at the wavelength corresponding to each bit.

50. The method of claim 49, wherein the value of each bit corresponds to the presence or absence of a corresponding refractive index pitch in said grating.

51. The method of claim 36, wherein said substrate has a length that is less than a predetermined value, said value being about 30, 65, 80, 125, 250, 500, 750 or 1000 microns.

52. The method of claim 36, wherein said substrate has a diameter that is less than a predetermined value, said value being about 30, 65, 80, 125, 250, 500, 750 or 1000 microns.

53. The method at claim 36, wherein said substrate has a reflective coating disposed thereon.

54. The method of claim 36, wherein said substrate has a coating disposed on at least a portion of said substrate, at least a portion of said coating being made of a material that allows sufficient amount of said incident light signal to pass through said material to allow detection of said code.

55. The method of claim 36, wherein said substrate has a coating material disposed on at least a portion of said substrate, said coating comprising a polymer.

56. The method of claim 36, wherein said substrate has a magnetic or electric charge polarization.

57. The method of claim 36, wherein said substrate has geometry having holes therein or protruding sections therein.

58. The method of claim 36, wherein at least a portion of said substrate has an end cross sectional geometry selected from the group: circular, square, rectangular, elliptical, clam-shell, D-shaped, arid polygon.

59. The method of claim 36, wherein at least a portion of said substrate has a side view geometry selected from the group: circular, square, rectangular, elliptical, clam-shell, D-shaped, and polygon.

60. The method of claim 36, wherein at least a portion of said substrate has a 3-D shape selected from the group: a cylinder, a sphere, a cube, and a pyramid.

61. The method of claim 36, wherein said substrate has a grating region where said grating is located and a non-grating region where said grating is not located; and wherein said substrate has a plurality of grating regions.

62. The method of claim 36, wherein said substrate has a grating region where said grating is located and a non-grating region where said grating is not located; and wherein said grating region has a refractive index that is greater than that of said non-grating region.

63. The method of claim 36, wherein said substrate has a grating region where said grating is located and a non-grating region where said grating is not located; and wherein said grating region has a refractive index that is not greater than that of said non-grating region.

64. The method of claim 36, wherein said incident light signal is incident on said substrate along a longitudinal grating axis of said grating.

65. The method of claim 36, wherein said incident light signal is incident on said substrate at an angle to a longitudinal grating axis of said grating.

66. The method of claim 36, wherein said grating is a thin grating or a blazed grating.

67. The method of claim 36, wherein said substrate comprises a plurality of said gratings.

68. The method of claim 36, wherein said substrate comprises a plurality of said gratings each at different locations within said substrate.

69. The method of claim 36, wherein said incident light signal comprises laser light.

70. The method of claim 36, wherein said substrate is photosensitive at least at said grating location.

* * * * *